US008619300B2

(12) United States Patent
Ulybin

(10) Patent No.: US 8,619,300 B2
(45) Date of Patent: Dec. 31, 2013

(54) DEVICE, SYSTEM, AND METHOD OF FAX RELAY

(75) Inventor: Vladimir Ulybin, Rishon Lezion (IL)

(73) Assignee: AudioCodes Ltd., Lod (IL)

( * ) Notice: Subject to any disclaimer, the term of this patent is extended or adjusted under 35 U.S.C. 154(b) by 427 days.

(21) Appl. No.: 13/086,423

(22) Filed: Apr. 14, 2011

(65) Prior Publication Data

US 2012/0262761 A1    Oct. 18, 2012

(51) Int. Cl.
*H04N 1/00* (2006.01)
(52) U.S. Cl.
USPC .......... 358/1.15; 358/407; 370/299; 370/352; 370/355; 370/395.52
(58) Field of Classification Search
USPC ......... 358/1.15, 405, 407; 370/282, 299, 352, 370/355, 395.52
See application file for complete search history.

(56) References Cited

U.S. PATENT DOCUMENTS

| 7,623,273 | B1 * | 11/2009 | Garakani et al. | ............... 358/407 |
| 2005/0110616 | A1 * | 5/2005 | Kajiwara | .................. 340/286.01 |
| 2006/0268831 | A1 * | 11/2006 | Ulybin | .......................... 370/352 |

OTHER PUBLICATIONS

ITU-T, the Telecommunication Standardization Sector of the International Telecommunication Union (ITU): ITU-T Recommendation T.38, "Series T: Terminals for Telematic Services; Facsimile—Group 3 protocols; Procedures for real-time Group 3 facsimile communication over IP networks", dated Sep. 2010.
ITU-T, the Telecommunication Standardization Sector of the International Telecommunication Union (ITU): ITU-T Recommendation T.38, "Series T: Terminals for Telematic Services; Facsimile—Group 3 protocols; Procedures for real-time Group 3 facsimile communication over IP networks", dated Apr. 2007.
ITU-T, the Telecommunication Standardization Sector of the International Telecommunication Union (ITU): ITU-T Recommendation T.30, "Series T: Terminals for Telematic Services: Procedures for document facsimile transmission in the general switched telephone network", dated Sep. 2005.
ITU-T, the Telecommunication Standardization Sector of the International Telecommunication Union (ITU): ITU-T Recommendation V.8, "Series V: Data Communication Over the Telephone Network; General; Procedures for starting sessions of data transmission over the public switched telephone network", dated Nov. 2000.

(Continued)

*Primary Examiner* — King Poon
*Assistant Examiner* — Jamares Q Washington
(74) *Attorney, Agent, or Firm* — Eitan, Mehulal & Sadot

(57) ABSTRACT

Device, system, and method of fax relay. For example, a fax relay apparatus includes a fax relay session controller which includes: a first converter to convert non-V.34 fax relay streams which are based on non-V.34 modulation and which are incoming from an Internet Protocol (IP) network into V.34 fax relay streams and to forward the converted V.34 fax relay streams to a V.34 fax relay gateway; and a second converter to convert output V.34 fax relay streams of said V.34 fax relay gateway into non-V.34 fax relay streams which are based on non-V.34 modulation and to forward the converted non-V.34 fax relay streams which are based on non-V.34 modulation to a remote device over the IP network.

29 Claims, 12 Drawing Sheets

(56) References Cited

OTHER PUBLICATIONS

ITU-T, the Telecommunication Standardization Sector of the International Telecommunication Union (ITU): ITU-T Recommendation V.34, "Series V: Data Communication over the Telephone Network; Interfaces and voiceband modems; A modem operating at data signalling rates of up to 33 600 bit/s for use on the general switched telephone network and on leased point-to-point 2-wire telephone-type circuits", dated Feb. 1998.

International Telecommunication Union (ITU), CCITT—the International Telegraph and Telephone Consultative Committee: Recommendation V.17, "Data communication over the telephone network a 2-wire modem for facsimile applications with rates up to 14400 bit/s", dated 1991.

ITU-T, the Telecommunication Standardization Sector of the International Telecommunication Union (ITU): ITU-T Recommendation V.27 ter, "Data Communication over the Telephone Network; 4800/2400 bits per second modem standardized for use in the general switched telephone network", dated 1988.

ITU-T, the Telecommunication Standardization Sector of the International Telecommunication Union (ITU): ITU-T Recommendation V.29, "Data Communication over the Telephone Network; 9600 bits per second modem standardized for use on point-to-point 4-wire leased telephone-type circuits", dated 1988.

* cited by examiner

DEVICE, SYSTEM, AND METHOD OF FAX RELAY

FIELD

The present invention is related to the field of facsimile (fax) communications.

BACKGROUND

Global availability and improved reliability of Internet Protocol (IP) networks have contributed to the development and utilization of Fax over IP (FoIP) technology. The International Telecommunication Union (ITU) has developed various international communication standards, particularly the ITU-T T.38 standard on real-time fax communication over IP networks.

A key element in T.38 FoIP communication may be a FoIP gateway, which serves as an interface between ITU-T T.30 fax terminal equipment and an IP network.

SUMMARY

Some embodiments include, for example, devices, systems, and methods of fax relay.

In some embodiments, for example, a fax relay apparatus includes a fax relay session controller which includes: a first converter to convert non-V.34 fax relay streams which are based on non-V.34 modulation and which are incoming from an Internet Protocol (IP) network into V.34 fax relay streams and to forward the converted V.34 fax relay streams to a V.34 fax relay gateway; and a second converter to convert output V.34 fax relay streams of said V.34 fax relay gateway into non-V.34 fax relay streams which are based on non-V.34 modulation and to forward the converted non-V.34 fax relay streams which are based on non-V.34 modulation to a remote device over the IP network.

In some embodiments, for example, the first converter comprises: a first transcoder to transcode non-V.34 fax relay packets into V.34 fax relay packets; a first deletion unit to block non-V.34 fax relay packets which cannot be transcoded into V.34 fax relay packets; a first packet generator to generate V.34 fax relay packets which are required by V.34 fax relay procedures and are disallowed by non-V.34 fax relay procedures; a first time alignment unit to align in time the V.34 fax relay streams before forwarding the V.34 fax relay streams to the V.34 fax relay gateway. The first transcoder, the first deletion unit, the first packet generator, and the first time alignment unit are operative to convert the incoming non-V.34 fax relay streams into V.34 fax relay streams.

In some embodiments, for example, the second converter comprises: a second transcoder to transcode V.34 fax relay packets into non-V.34 fax relay packets; a second deletion unit to block V.34 fax relay packets which cannot be transcoded into non-V.34 fax relay packets; a stream generator to generate non-V.34 fax relay streams which are required by non-V.34 fax relay procedures and are disallowed by V.34 fax relay procedures; a collision avoidance unit to block the retransmitted V.34 fax relay streams of said V.34 fax relay gateway and to avoid collision of fax relay streams exchanged over the IP network; a second time alignment unit to align in time the non-V.34 fax relay streams before forwarding the non-V.34 fax relay streams to the IP network. The second transcoder, the second deletion unit, the second packet generator, the collision avoidance unit, and the second time alignment unit are operative to convert output V.34 fax relay streams of said V.34 fax relay gateway into non-V.34 fax relay streams.

In some embodiments, for example, the fax relay session controller comprises: a V.8 control unit to perform V.8 message exchange adapted to avoid fax relay disconnection due to incompatibility of a first fax modulation selected by the V.34 fax relay gateway and a second fax modulation selected by the remote device.

In some embodiments, for example, the fax relay session controller comprises: a fax data rate control module to perform compromised management of data signaling rate of non-V.34 fax relay over the IP network, by compromising between fax relay session duration and fax relay reliability, and by taking into account a short duration of V.34 control channel signal exchange.

In some embodiments, for example, said fax relay session controller and said V.34 fax relay gateway are linked internally within a single gateway.

In some embodiments, for example, the fax relay session controller is external to a media gateway which comprises said V.34 fax relay gateway.

In some embodiments, for example, the fax relay session controller comprises: a bypassing means for passing-through one or more fax relay streams which correspond to a same modulation used by both the V.34 fax relay gateway and the remote device.

In some embodiments, for example, the fax relay session controller comprises: a V.8 control unit to detect V.8 packet exchange completed with an acknowledged V.34 fax application profile.

In some embodiments, for example, the fax relay session controller comprises: a state machine module to inspect the fax relay streams exchanged over the IP network, to apply bypassing means for passing-through one or more fax relay streams which correspond to a same modulation used by both the V.34 fax relay gateway and the remote device, to detect fallback from V.34 modulation to non-V.34 modulation, and to activate and control conversion of fax relay streams when a fallback from V.34 modulation to non-V.34 modulation is detected but said V.34 fax relay gateway cannot already accept the non-V.34 fax relay streams.

In some embodiments, for example, the fax relay session controller is adapted to operate at V.34 fax call side.

In some embodiments, for example, the fax relay session controller is adapted to operate at V.34 fax answer side.

In some embodiments, for example, the fax relay session controller is linked to said V.34 fax relay gateway, and the V.34 fax relay gateway is a V.34-only fax relay gateway.

In some embodiments, for example, the fax relay session controller is to initiate, immediately upon fax relay session setup, conversion of incoming non-V.34 and outgoing V.34 fax relay streams into incoming V.34 and outgoing non-V.34 fax relay streams, respectively.

In some embodiments, for example, the remote device is selected from the group consisting of: a remote gateway, and an Internet-aware fax device.

In some embodiments, for example, the apparatus is a gateway which comprises said fax relay session controller and said V.34 fax relay gateway which are linked internally within said gateway.

In some embodiments, for example, the fax relay apparatus is able to perform fax relay communication over the IP network between: a fax equipment able to operate according to V.34 modulation; and a first remote device which selects non-V.34 modulation.

In some embodiments, for example, the fax relay apparatus is able to perform fax relay communication over the IP network between: a fax equipment able to operate according to V.34 modulation; and a second remote device which performs fallback from V.34 modulation to non-V.34 modulation.

In some embodiments, for example, a method of fax relay includes: converting non-V.34 fax relay streams incoming from an Internet Protocol (IP) network into V.34 fax relay streams; forwarding the converted V.34 fax relay streams to a V.34 fax relay gateway; converting output V.34 fax relay streams of said V.34 fax relay gateway into non-V.34 fax relay streams; forwarding the converted non-V.34 fax relay streams to a remote device over the IP network.

In some embodiments, for example, converting the incoming non-V.34 fax relay streams comprises: transcoding non-V.34 fax relay packets into V.34 fax relay packets; blocking non-V.34 fax relay packets which cannot be transcoded into V.34 fax relay packets; generating V.34 fax relay packets which are required by V.34 fax relay procedures and are disallowed by non-V.34 fax relay procedures; and aligning in time the V.34 fax relay streams before forwarding the V.34 fax relay streams to said V.34 fax relay gateway.

In some embodiments, for example, converting output V.34 fax relay streams comprises: transcoding V.34 fax relay packets into non-V.34 fax relay packets; blocking V.34 fax relay packets which cannot be transcoded into non-V.34 fax relay packets; generating non-V.34 fax relay streams which are required by non-V.34 fax relay procedures and are disallowed by V.34 fax relay procedures; blocking the retransmitted V.34 fax relay streams of said V.34 fax relay gateway and to avoid collision of fax relay streams exchanged over the IP network; and aligning in time the non-V.34 fax relay streams before forwarding the non-V.34 fax relay streams to the IP network;

In some embodiments, for example, the method includes: performing V.8 message exchange adapted to avoid fax relay disconnection due to incompatibility of a first fax modulation selected by the V.34 fax relay gateway and a second fax modulation selected by the remote device.

In some embodiments, for example, the method includes: performing compromised management of data signaling rate of non-V.34 fax relay over the IP network, by compromising between fax relay session duration and fax relay reliability, and by taking into account a short duration of V.34 control channel signal exchange.

In some embodiments, for example, converting non-V.34 fax relay streams comprises converting within said V.34 fax relay gateway; and converting output V.34 fax relay streams comprises converting within said V.34 fax relay gateway.

In some embodiments, for example, converting non-V.34 fax relay streams comprises converting externally to said V.34 fax relay gateway; and converting output V.34 fax relay streams comprises converting externally to said V.34 fax relay gateway.

In some embodiments, for example, the method includes: passing without conversion one or more fax relay streams which correspond to a same modulation used by both the V.34 fax relay gateway and the remote device.

In some embodiments, for example, the method includes: detecting V.8 packet exchange completed with an acknowledged V.34 fax application profile.

In some embodiments, for example, the method includes: inspecting the fax relay streams exchanged over the IP network; passing without conversion one or more fax relay streams which correspond to a same modulation used by both the V.34 fax relay gateway and the remote device; detecting fallback from V.34 modulation to non-V.34 modulation; and activating and controlling conversion of fax relay streams when a fallback from V.34 modulation to non-V.34 modulation is detected but said V.34 fax relay gateway cannot already accept the non-V.34 fax relay streams.

In some embodiments, for example, converting non-V.34 fax relay streams is performed at V.34 fax call side; and converting output V.34 fax relay streams is performed at said V.34 fax call side.

In some embodiments, for example, converting non-V.34 fax relay streams is performed at V.34 fax answer side; and converting output V.34 fax relay streams is performed at said V.34 fax answer side.

In some embodiments, for example, the V.34 fax relay gateway is a V.34-only fax relay gateway.

In some embodiments, for example, the method includes: immediately upon fax relay session setup, initiating conversion of incoming non-V.34 and outgoing V.34 fax relay streams into incoming V.34 and outgoing non-V.34 fax relay streams, respectively.

In some embodiments, for example, the method includes: communicating with said remote device; and the remote device may be selected from the group consisting of: a remote gateway, and an Internet-aware fax device.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

Figure 8:
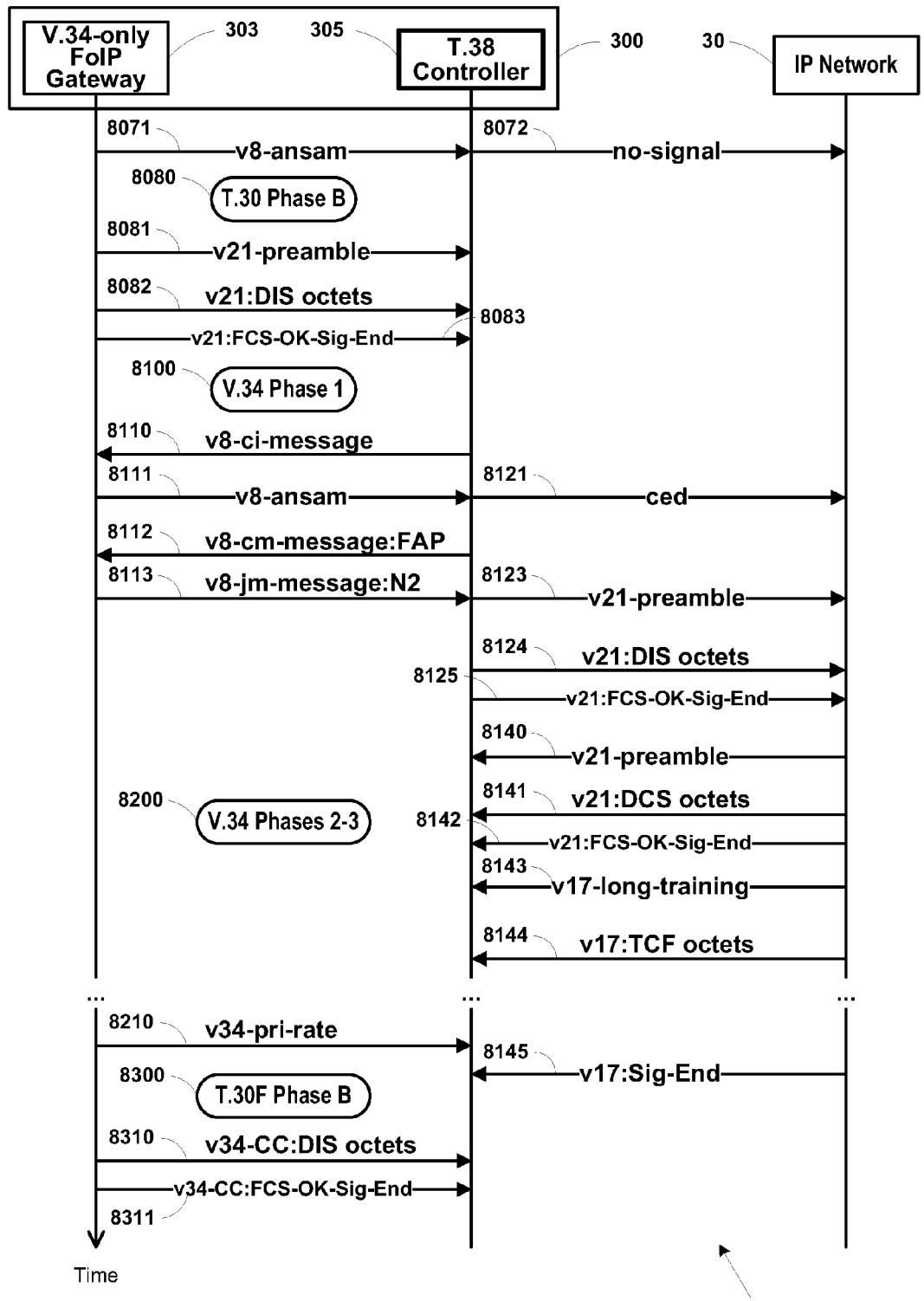

FIG. 8 is a schematic chart demonstrating phases in fax relay from a V.34-only T.38 receiving gateway to a regular T.38 gateway or IP fax, in accordance with some demonstrative embodiments of the invention, during V.34 phases 1-3 and T.30F phase B.

Figure 9:
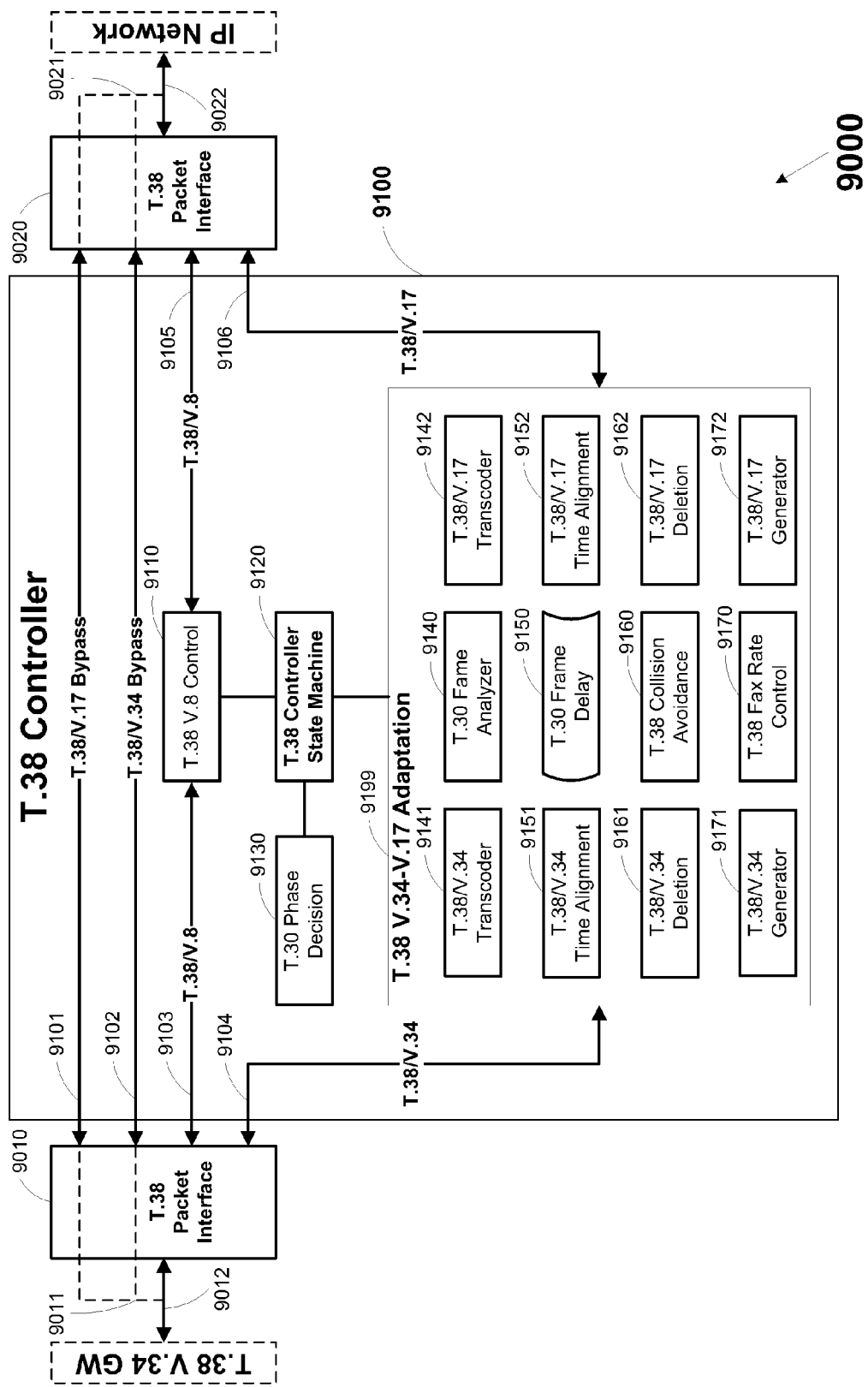

FIG. 9 is a schematic block diagram illustration of a T.38 session controller in accordance with some demonstrative embodiments of the invention.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The present invention may provide fax relay from V.34 to a regular, non-V.34, modulation, and may provide V.34 fax communication over IP networks. The present invention may include, for example, a gateway for communicating fax data over a packet-switched network, e.g., over the Internet and/or other suitable packet-based network(s).

The applicant has realized that conventional fax relay systems may suffer from deficiencies or incompatibilities which may lead, in certain situations, to fax call failures. Accordingly, the present invention may avoid V.34 fax relay call failures, which may be caused in conventional systems by a V.34-to-V.17 fallback occurring at a remote gateway (such fallback is further described herein). For example, the present invention may avoid V.34 fax relay failures due to incompatibility of fax modulations selected by multiple gateways or fax devices. Such failures may be avoided by utilizing real-time fax relay by a FoIP gateway using V.34 modulation.

The applicant has realized that fax asymmetry may occur, for example, when one communication side successfully completes one or more first phases of V.34 modulation, but the other communication side abnormally exits from the V.34 modulation with a fallback to V.17 modulation or to a lower modulation. This asymmetry typically may not occur in direct V.34 fax calls performed over a switched network. For example, two V.34 fax terminals communicating over a switched network may always be synchronized between themselves by the same V.34 and T.30 phase. Furthermore, a T.38 communication between a V.34 FoIP gateway and a V.34 IP fax device may not suffer from an asymmetry problem, because an IP fax device may not perform analog signal processing.

The applicant has further realized another scenario in which V.34 fax call failure may occur. For example, per T.38 version 3, FoIP communication may be attempted between: (a) a FoIP gateway supporting only V.34 modulation, and (b) a T.38 remote gateway or an IP fax device limited to V.17 modulation. Since there may be no compatible mode of communication between a V.34-only FoIP gateway and a regular T.38 gateway, the fax relay call may fail.

The present invention may include, for example, a T.38 FoIP gateway capable of performing fax relay from V.34 to a fallback modulation scheme. For example, the FoIP gateway of the present invention may avoid V.34 fax relay call failures; for example, a fax relay call failure which may be caused by V.34-to-V.17 fallback occurring at a remote gateway side, or a fax relay call failure due to incompatibility of fax modulation schemes selected by multiple fax gateways and/or fax terminals.

The present invention may allow a FoIP gateway to communicate with a remote gateway which, for example, (a) may support only low T.38 versions 0-2; or (b) may not allow V.34 modulation but may declare a support of the T.38 version 3, e.g., to allow an obsolete V.33 (14,400 bps) fax modulation not available in older versions of T.38; or (c) temporarily may not allow V.34 modulation due to lack of computation resources for V.34 fax relay. The present invention may thus provide a compatible solution for a communication between the V.34-only T.38 gateway and a conventional T.38 gateway or IP fax, without causing the fax relay call to fail.

Figure 1:
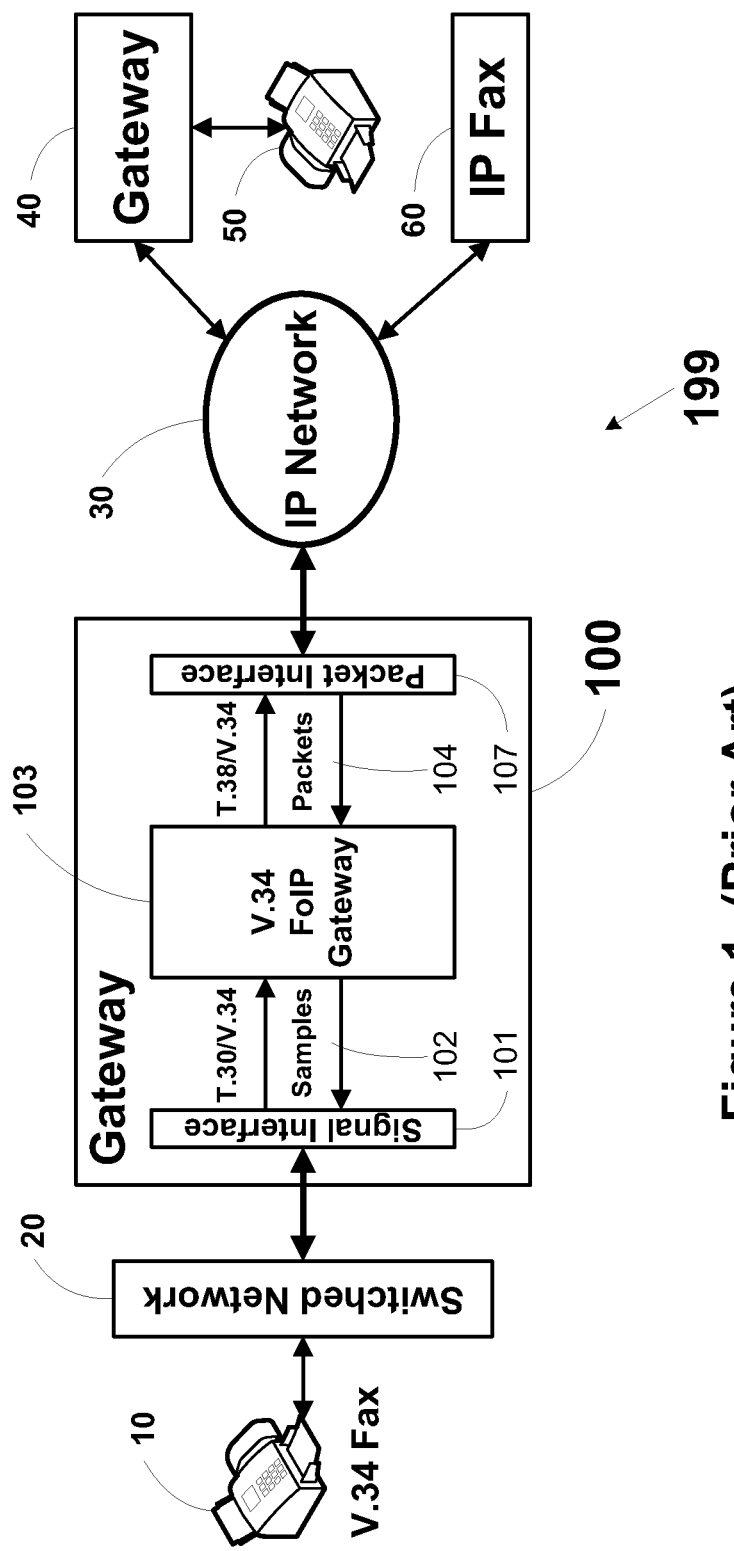
FIG. 1 is a schematic block-diagram illustration of a prior art FoIP communication system.

Reference is made to FIG. 1, which is a schematic block-diagram illustration of a prior art FoIP communication system 199. System 199 may include, on one communication side, a V.34 fax terminal 10 connected to a switched network 20; and may further include, on another communication side, an IP network 30 connected to a remote gateway 40 and/or an IP fax device 60. A FoIP gateway 100 (e.g., a media gateway) may be connected between the switched network 20 and the IP network 30.

The FoIP gateway 100 may receive analog signals from a facsimile terminal, for example the V.34 fax terminal 10, through the switched network 20. The FoIP gateway 100 may demodulate or convert the analog fax transmission to a fax data set; may encode and packetize the fax data set according to the T.38 FoIP protocol; and may relay the fax packets over the IP network 30 to the remote gateway 40 or to an Internet-aware fax device, e.g., the IP fax device 60.

The FoIP gateway 100 may include, for example, a signal interface 101 and a network packet interface 107, which may be interconnected through a V.34 FoIP gateway 103. At the analog signal communication side, the V.34 FoIP gateway 103 may include or may communicate with the signal interface 101 to perform input/output of sampled signals 102 from/to a V.34 call or answer fax (e.g., the V.34 fax terminal 10) over the switched network 20 or directly over a two-wire cable. At the digital communication side, the V.34 FoIP gateway 103 may include or may communicate with the network packet interface 107 for exchanging T.38 streams 104 with the remote gateway 40 or IP fax 60 over the IP network 30. The remote gateway 40, in turn, may be connected directly or over a switched network to a fax terminal 50, which may be an answer fax terminal or a call fax terminal.

Furthermore, the FoIP gateway 100 may receive fax packets from the remote gateway 40 or IP fax 60 over the IP network 30. The FoIP gateway 100 may de-packetize and may decode the received fax packets according to the T.38 protocol; may transmit fax signals according to T.30 (Group 3) fax procedures; and may forward the transmitted analog fax signals via switched network 20 to the V.34 fax terminal 10.

The regular T.30 procedures may include transmission of T.30 control signals by utilizing V.21 channel 2 modulation at 300 bits per second (bps); and transmission of fax image type signals transmitted by using V.27ter, V.29, and V.17 modulation schemes. The maximum data signaling rate of regular fax transmission is 14,400 bps, achieved by V.17 modulation.

Advanced procedures of T.30 Annex F (T.30F) define the usage of V.34 modulation allowing fax communications at data rates of up to 33,600 bps. The T.30 control signals of V.34 fax may be transmitted full-duplex by using V.34 control channel modulation at 1,200 bps or optionally at 2,400 bps. The fax image may be transmitted by using V.34 half-duplex primary channel.

The T.38 Recommendation initially published in 1998 defined the regular T.30 fax relay over IP. Due to high complexity of V.34 modulation, and due to the T.30 incompatibility of V.34 fax relative to regular fax communication, for several years the T.38 had no support of V.34 fax relay; and the first three versions of T.38—namely, version 0 (dated 1998), version 1 (dated 2000), and version 2 (dated 2002)—were based on regular fax modulation schemes.

In order to allow FoIP communication between V.34 fax terminals by using T.38 of version 0, version 1 or version 2, a FoIP gateway may need to force the V.34 fax terminals to operate in a fallback mode limited by V.17 modulation at data signaling rates (fax rates) of up to 14,400 bps. Conventional gateways may use different methods to force a V.34-to-V.17 fallback; for example, may block V.8 ANSam tone or replace it by T.30 CED tone, or, may block V.8 Call Menu (CM). Such forcing of V.34-to-V.17 fallback may be performed before or during V.8 procedures (V.21 modulation) and result in establishing a T.38 session based on regular (non-V.34) modulation at both sides of communication. This type of fallbacks may be denoted as V.34-to-V.17 fallbacks of "type 1".

A growing usage of V.34 fax terminals required adequate signal processing by FoIP gateways and an adaptation of the FoIP protocol. Accordingly, version 3 of the T.38 (dated 2007) defines an extended FoIP protocol of V.34 fax communication over IP at fax rates of up to 33,600 bps.

The applicant has realized that at the level of analog signal processing, two communicating V.34 FoIP gateways may be highly autonomous of each the other. A main requirement may be to limit the fax rate of a T.38 emitting gateway (e.g., V.34 primary channel demodulating gateway) to be smaller or equal to the fax rate of a T.38 receiving gateway (e.g., V.34 primary channel modulating gateway).

The applicant has realized that not all FoIP gateways may have identical capabilities: for example, some FoIP gateways may support only V.34 modulation, whereas other FoIP gateways may support only V.17 modulation. As a result, some fax calls, which may be placed among two or more incompatible FoIP gateways or fax terminals, may fail.

Figure 2:
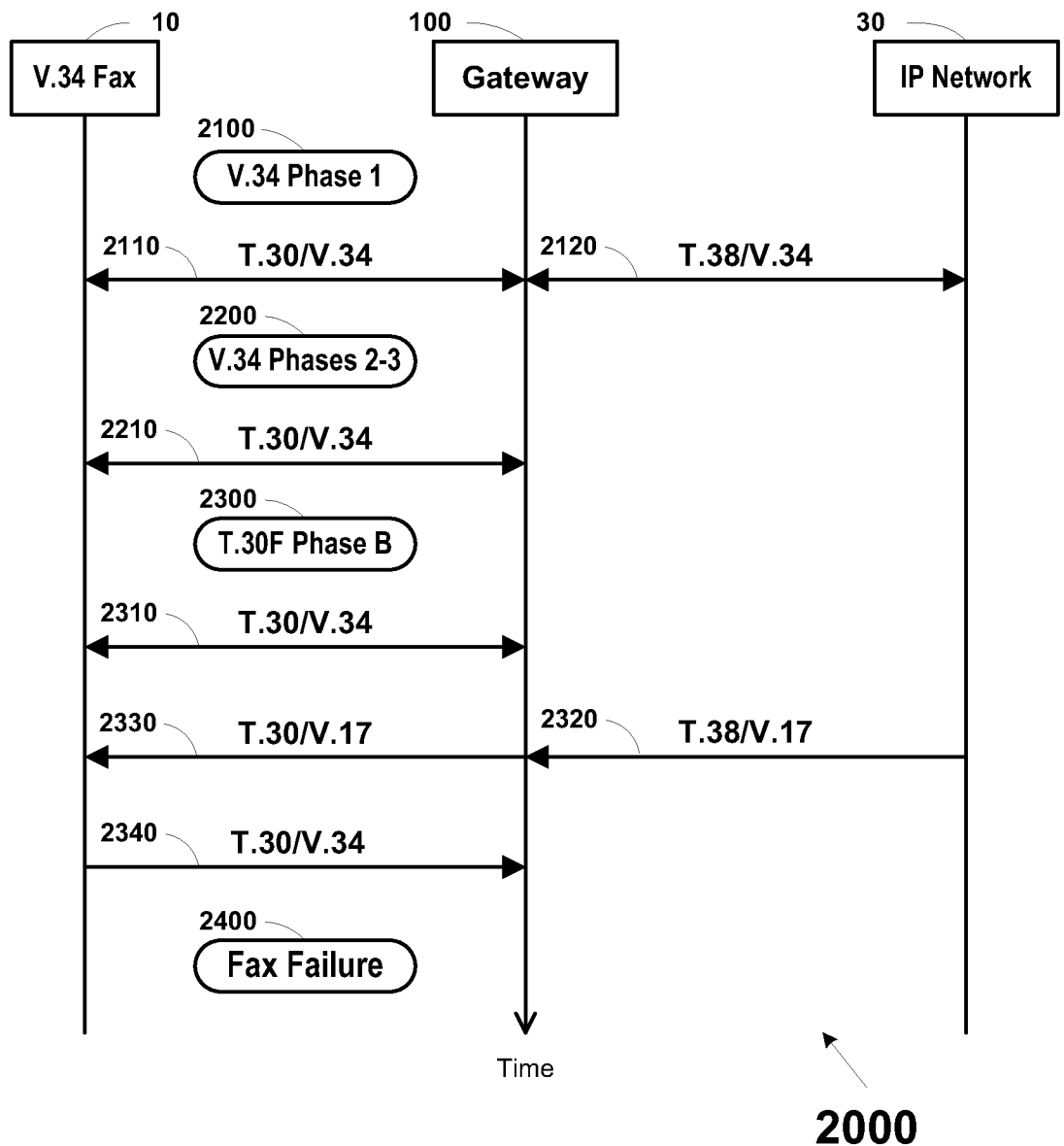
FIG. 2 is a schematic chart demonstrating phases in the operation of a prior art FoIP gateway.

Reference is made to FIG. 2, which is a schematic chart 2000 demonstrating phases in the operation of the prior art V.34-capable FoIP gateway 100.

The FoIP gateway 100 may communicate with a remote gateway via the IP network 30. The FoIP gateway 100 may be connected over a switched network to the V.34 fax terminal 10. The FoIP gateway 100 may exchange analog V.34 signals with the V.34 fax terminal 10. During a V.34 call establishment, the FoIP gateway 100 may pass the V.34 phase 1 (block 2100) by utilizing V.8 signal interaction 2110 with the connected V.34 fax terminal 10 and by further utilizing V.8 message exchange 2120 with the remote gateway.

The applicant has realized that a serious problem for V.34 fax relay may occur if a remote device makes a V.34-to-V.17 fallback after successful exchanging by V.8 packets. This problem may be described as the following. By performing a local signal exchange 2210 with the connected V.34 fax terminal 10, the FoIP gateway 100 may pass the V.34 phases 2-3 (block 2200) and may autonomously enter the T.30F phase B (block 2300). During phase B, the FoIP gateway 100 may exchange V.34 control channel signals 2310 with the connected V.34 fax terminal 10, and may wait for a T.38/V.34 control channel stream transferring T.30F control data from the remote gateway over the IP network 30. Due to V.34 demodulation failure, or due to other problems which may occur at a remote pair of a FoIP gateway and a remote V.34 fax terminal, the FoIP gateway 100 which may process the signals 2210 of V.34 phases 2-3 or the V.34 control channel signals 2310 of T.30F phase B, may receive a regular T.38 stream 2320 transferring the regular T.30 control packets of Group 3 fax limited by V.17 modulation. However, because regular T.30 signals may not be supported since V.34 phase 2, the FoIP gateway 100 may either (a) ignore the regular T.38 stream 2320 completely, or (b) exit from V.34 modulation to regular fax relay operation with a V.21-based T.30 control transmission 2330 toward the V.34 fax terminal 10. Regardless of which option was selected by the FoIP gateway 100, the V.34 fax terminal 10 may continue a current phase with transmission 2210 (V.34 phases 2-3) or 2310 (T.30F phase B) toward the FoIP gateway 100; and as a result, the fax call may fail (block 2400).

The Applicant considers the V.34-to-V.17 fallbacks which may occur after V.34 fax relay call establishment as V.34-to-V.17 fallbacks of "type 2". Such type of V.34-to-V.17 fallback may be principally different from the noted above V.34-to-V.17 fallback of type 1 used by conventional gateways to force the regular T.38 session with a regular G3 fax modulation(s) at both sides of communication, for example in view of the following demonstrative differences: (a) before the fallback of type 2 occurs, the communicating gateways have confirmed the usage of T.38 version 3 or higher, but the fallback of type 1 may be forced in order to avoid the usage of T.38 version 3 or higher; (b) the V.34-to-V.17 fallback of type 2 may occur after V.8 interaction at one or both communication sides completed successfully with confirmed usage of V.34 modulation, but the goal of type 1 fallback may be to block the V.8 CM/JM completely or to disallow the V.34 modulation capability in V.8 packets; (c) the V.34-to-V.17 fallback of type 2 may occur after the starting of the V.34 modulation in V.34 phase 2 at one gateway or at both gateways, but the fallback of type 1 may be forced to prevent starting the V.34 modulation at both communication sides; (d) the regular T.30 signals relayed after the V.34-to-V.17 fallback of type 2 based on V.21, V.27 ter, V.29, and V.17 modulations may not be supported by V.34 modulation, but after the fallback of type 1, these signals may be native signals for gateways and fax terminals; (e) conventional V.34 fax relay gateways may have a high probability to fail after the V.34-to-V.17 fallback of type 2, but the fallback of type 1 may be safe for fax relay calls; (f) the V.34-to-V.17 fallback of type 2 may be seldom or may occur with specific fax terminals or gateways, while most of other fax calls may be relayed over the IP network successfully at fax data rates up to 33,600 bps, but the type 1 fallback usage may be a system decision to disallow the V.34 fax modulation for all fax relay calls performed over the IP network.

Figure 3A:
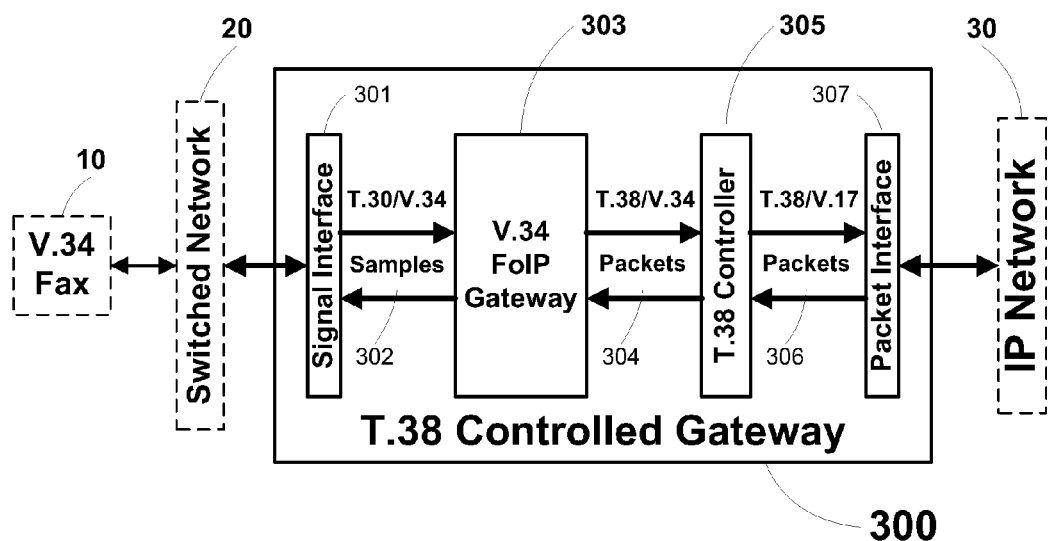
FIG. 3A is a schematic block-diagram illustration of a gateway in accordance with some demonstrative embodiments of the invention.
Figure 4:
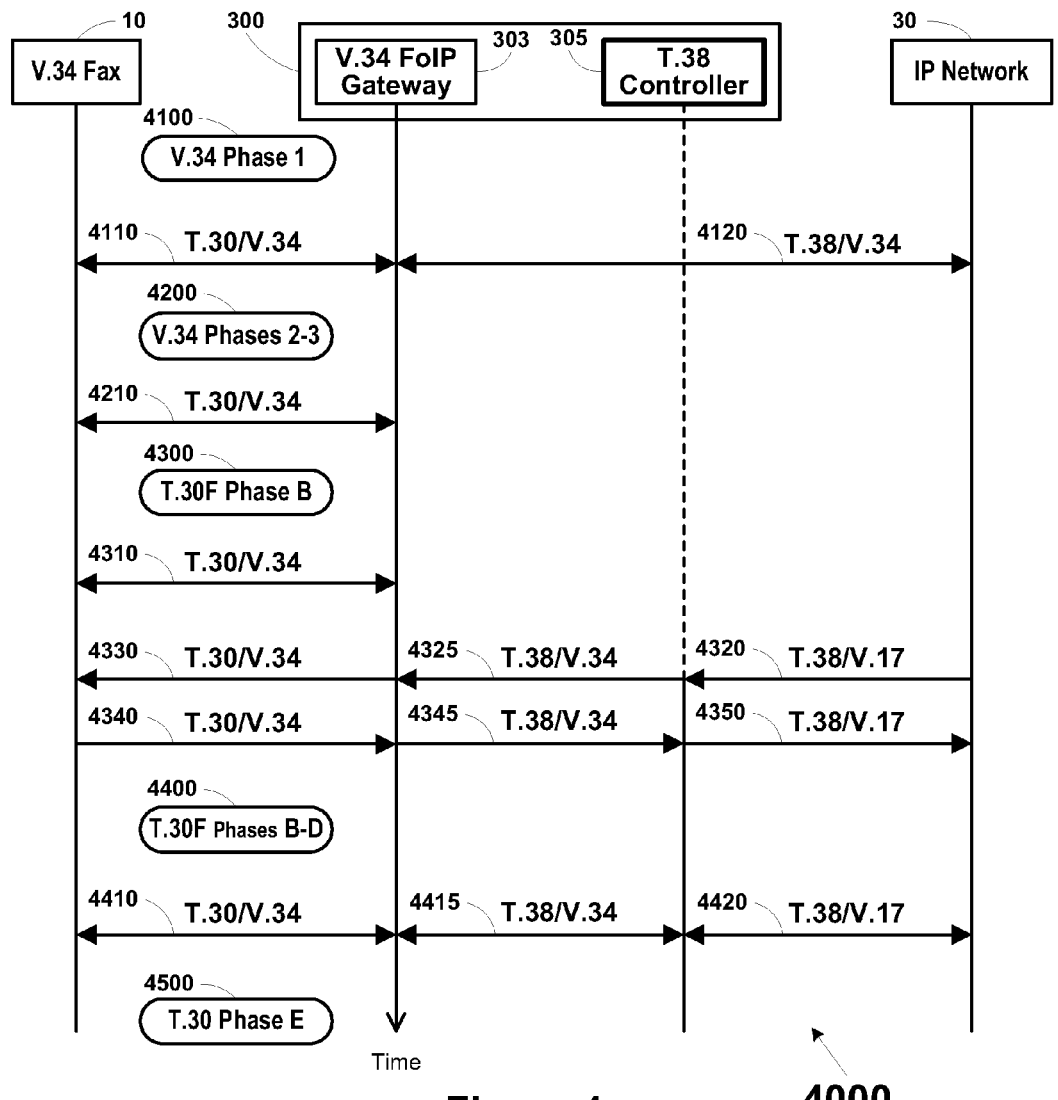
FIG. 4 is a schematic chart demonstrating phases in the operation of a FoIP gateway in accordance with some demonstrative embodiments of the invention.

Reference is made to FIG. 3A, which is a schematic block-diagram illustration of a gateway 300 in accordance with some demonstrative embodiments of the invention. Reference is further made to FIG. 4, which is a schematic chart 4000 demonstrating phases in the operation of a FoIP gateway (e.g., gateway 300 of FIG. 3A) in accordance with some demonstrative embodiments of the invention. Gateway 300 may solve possible problems of T.38/V.34-T.38/V.17 fallback and modulation incompatibility.

As shown in FIG. 3A, gateway 300 (which may be, for example, a media gateway) may include a V.34 FoIP gateway 303 and a T.38 session controller 305, as well as a signal interface 301 and a packet interface 307. The T.38 session controller 305 may optionally be implemented similarly to the T.38 session controller 9000 of FIG. 9, as discussed herein.

The V.34 FoIP gateway 303 may perform V.34 fax relay per T.38 version 3 or higher, by exchanging T.30/V.34 fax signals with V.34 fax terminal 10 which may be connected to the gateway 300 over switched network 20. The V.34 FoIP gateway 303 may communicate with a remote gateway (not shown) over IP network 30 via a packet interface 307, indirectly (e.g., unlike the convention V.34 FoIP gateway 103 of FIG. 1), through the T.38 session controller 305.

Gateway 300 may be internally controlled by the T.38 session controller 305, and may perform communication of a V.34 fax 10 over the IP network 30. The main T.30 and T.38 processing may be performed by the V.34 FoIP gateway 303. The T.30/V.34 fax signals 302 may be exchanged by the gateway 303 with the fax 10 through signal interface 301 and switched network 20. Packet interface 307 may be used for a digital link over the IP network 30. The output T.38 streams of the V.34 FoIP gateway 303 (e.g., before being sent to the packet interface 307), and the input T.38 streams received from the IP network 30 (e.g., before being forwarded to the V.34 FoIP gateway 303), may be controlled by the T.38 session controller 305. The V.34 fax relay streams 304 of the V.34 FoIP gateway 303 may be adapted by the T.38 controller 305 to regular fax relay streams 306 of the IP network 30.

In accordance with the present invention, gateway 300 may be capable of performing asymmetric (e.g., T.30/V.34-T.38/V.17) fax relay. For example, gateway 300 utilizes the T.30F and V.34 modulation for analog signal exchange over a switched network with a connected V.34 fax, and communicates with a remote gateway or IP fax over the IP network by using T.38 streams based on a V.17 or lower modulation schemes. While performing a standard fax relay (e.g., T.30/V.34-T.38/V.34), the gateway 300 may be capable of switching in real time to asymmetric fax relay (e.g., T.30/V.34-T.38/V.17). This may be performed, for example, in response to a fallback from the T.38/V.34 to a regular T.38 fax relay made by a remote gateway.

The T.38 controller 305 may monitor the T.38 packets forwarded by the V.34 FoIP gateway 303 to the IP network 30. The T.38 controller may further monitor the T.38 packets to be received by the FoIP gateway 303 from the IP network 30. If a modulation scheme used by a remote fax relay gateway or IP fax coincides with (or may be identical to, or may be compatible with) a modulation scheme of the V.34 FoIP gateway 303, then the T.38 session controller 305 may be transparent for fax relay packets; for example, the T.38 session controller 305 may inspect—but does not modify—the T.38 content of fax relay streams 4120. Referring also to FIG. 3A, for example, the T.38 session controller 305 may inspect but may not change the T.38 content of packets 304 and 306. For example, the T.38 controller 305 may be transparent for a normal T.38/V.34 fax relay or for a regular G3 fax relay established at both sides of T.38 communication. However, if a remote gateway performs a fallback from T.38/V.34 to T.38/V.17 fax relay protocol, but the FoIP gateway 303 cannot already switch from V.34 to V.17 modulation, then the T.38 session controller 305 performs an adaptation processing of streams 304 and 306; for example, as detailed herein with reference to FIGS. 5-8.

During V.34 call establishment, the V.34 FoIP gateway 303 may pass the V.34 phase 1 (block 4100) by means of (a) V.8 signal interaction 4110 with a connected V.34 fax, and (b) V.8 message exchange 4120 through the T.38 controller 305 with a remote gateway or IP fax over the IP network 30.

Performing a local signal exchange 4210 with the connected V.34 fax 10, the V.34 FoIP gateway 303 may pass the V.34 phases 2-3 (block 4200) and may autonomously enter the T.30F phase B (block 4300). During the T.30F phase B, the V.34 FoIP gateway 303 may exchange the V.34 control channel signals 4310 with the V.34 fax 10, and may wait for T.38/V.34 control channel stream transferring a T.30F control data from a remote gateway or IP fax over the IP network 30.

The T.38 session controller 305 may successfully pass the V.8 message exchange 4120 confirming that V.34 modulation is utilized. For example, the T.38 session controller 305 may inspect the T.38 streams arriving from the IP network 30, to detect a fallback from a V.34 to V.17 or a lower modulation. For example, due to V.34 demodulation failure or other possible problems at the remote side, the T.38 controller 305 may receive a T.38 fallback stream 4320 transferring the regular T.30 control packets of Group 3 fax limited by V.17 modulation. Since the moment of receiving a fallback stream and onward, the T.38 session controller may control the T.38 streams in both directions, namely, in a first direction from the FoIP gateway 303 to the IP network 30, and in a second direction from the IP network 30 to the FoIP gateway 303.

The T.38 session controller 305 may analyze and/or interpret the incoming T.38 stream 4320, and may interpret it as a T.38/V.34 stream. For example, the V.21 preamble flags packet may be blocked, and the T.30 data of the V.21 data packets may optionally be modified, T.38 transcoded, and forwarded to the V.34 FoIP gateway 303 as the T.38 V.34 control channel data packets 4325 for transmission 4330 toward the V.34 fax terminal 10.

The V.34 fax terminal 10 may receive an awaited V.34 control channel signal 4330, and may typically responds with a V.34 control channel transmission 4340. The FoIP gateway 303 demodulates the signal 4340 and forwards the corresponding T.38 packets 4345 of V.34 control channel data to the T.38 session controller 305. Then, the T.38 session controller 305 may optionally modify the T.30 data, and may T.38-transcode the V.34 control channel data into the V.21 data packets; and then the T.38 session controller 305 may forward a regular T.38 stream 4350 to the remote gateway over the IP network 30.

The FoIP gateway 303 may continue the V.34 analog signal processing 4410 in T.30F phases B-D (block 4400). The FoIP gateway 303 may exchange T.38/V.34 streams 4415 with the T.38 session controller 305; and in turn, the T.38 session controller 305 may exchange regular T.38 streams 4420 with the remote gateway over the IP network 30. The V.34 FoIP gateway 303 may perform a V.34 fax relay per T.38 version 3 or higher as if no problem has occurred (excluding probable reduction of data signaling rate); and the remote gateway may continue regular T.38 operation. The fax call may successfully end in T.30 phase E (block 4500); for example, the FoIP gateway 303 may physically disconnect from the V.34 fax terminal 10, and the FoIP gateway 303 may close the T.38 session over the IP network 30.

The T.38 session controller 305 may perform one or more operations in order to adapt the V.34 FoIP gateway 303 into performing fax relay. For example, the T.38 session controller may: (a) transcode a regular fax relay stream received from the IP network 30 into a V.34 fax relay stream forwarded to the V.34 FoIP gateway 303; (b) handle and block regular fax relay packets which cannot be transcoded into V.34 fax relay packets; (c) generate V.34 fax relay packets required by V.34 fax relay procedures of the V.34 FoIP gateway 303 but not allowed by regular fax relay procedures at the remote gateway or the remote IP fax; (d) align in time the V.34 fax relay streams before forwarding them to the V.34 FoIP gateway 303; (e) transcode a V.34 fax relay stream of the V.34 FoIP gateway 303 into a regular fax relay stream forwarded to the IP network 30; (f) block the V.34 fax relay packets which cannot be transcoded into regular fax relay packets; (g) generate the regular fax relay streams required by regular fax relay procedures but not allowed by V.34 fax relay procedures; (h) block the retransmitted V.34 fax relay streams of the V.34 FoIP gateway 303 to avoid a collision of fax relay streams exchanged over the IP network; (i) align in time the regular fax relay streams before forwarding them to the IP network 30; (j) perform a V.8 message exchange adapted to exclude fax relay disconnection caused by incompatibility of fax modulations selected by the V.34 FoIP gateway and by a remote gateway or IP fax; (k) perform a compromised management of data signaling rate of regular fax relay over the IP network, e.g., if a compromise between fax relay session duration and reliability is required (for example, due to short duration of V.34 control channel signal exchange). The T.38 session controller 305 may perform other suitable operations.

In some embodiments, gateway 300 may operate as a T.38 emitter, adapted to communicate with remote gateway(s) which perform a V.34-to-V.17 fallback at T.38 receiving side.

In other embodiments, gateway 300 may operate as a T.38 receiver, adapted to communicate with remote gateway(s) which perform a V.34-to-V.17 fallback at T.38 emitting side.

In yet other embodiments, gateway 300 may operate as a V.34-only fax relay gateway, adapted to communicate with regular T.38 gateways or IP faxes that do not support V.34 fax relay.

Figure 3B:
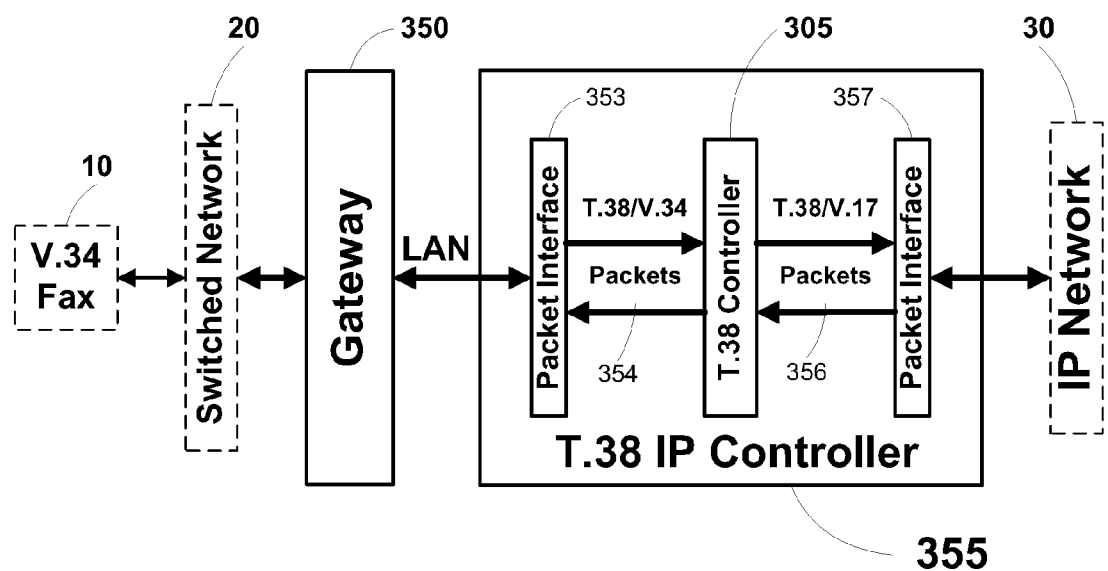
FIG. 3B is a schematic block-diagram illustration of another gateway in accordance with some demonstrative embodiments of the invention.

Reference is made to FIG. 3B, which is a schematic block-diagram illustration of a gateway 350 which may be externally controlled by a T.38 session controller 355, in accordance with some demonstrative embodiments of the invention. The T.38 session controller 355 may include a packet interface 353 in communication with the gateway 350; a T.38 controller 305; and a packet interface 357 in communication with IP network 30. The T.38 session controller 355 may optionally be implemented similarly to the T.38 session controller 9000 of FIG. 9, as discussed herein Gateway 350 may exchange analog fax signals with connected V.34 fax terminal 10 over switched network 20. Gateway 350 may communicate over IP network 30 indirectly, through the external T.38 session controller 355. The T.38 controller 305 of the external T.38 session controller 355 may be generally similar to the internal T.38 session controller 305 of FIG. 3A. The external T.38 session controller 355 may be linked to the gateway 350 over a Local Area Network (LAN) or a Wide Area Network (WAN) by using packet interface 353. The T.38 session controller 355 may communicate with a remote gateway or IP fax over IP network 30 by using packet interface 357. The T.38 content of streams 354 and 356 may be similar to that of streams 304 and 306 of FIG. 3A, respectively.

The T.38 operation of the components of FIG. 3B may be generally similar to the operation of the respective components shown in FIG. 3A. Accordingly, discussions herein with regard to the operation of the internally-controlled gateway 300 of FIG. 3A, may similarly apply to the operation of the externally-controlled gateway 350 of FIG. 3B, and vice versa.

The external T.38 session controller 355 may be utilized in a system having a V.34-capable gateway to be controlled. Internal allocation of the T.38 controller into a gateway (e.g., into gateway 300 of FIG. 3A) may have additional and/or other benefits; for example: ability to share resources between the V.34 FoIP gateway 303 and the internal T.38 session controller 305; optimization of gateway fax procedures to asymmetric fax relay; and/or optimization of T.38 control according to states of the V.34 FoIP gateway 303.

In some embodiments, the V.34 FoIP gateway (e.g., denoted 303) and the T.38 session controller (e.g., denoted 305) may both be internal components or sub-units of one device, for example, a media gateway or other apparatus. In other embodiments, the V.34 FoIP gateway (e.g., denoted 350) and the T.38 session controller (e.g., denoted 355) may be two separate devices, for example, such that the T.38 session controller may be external to the V.34 FoIP gateway.

Prior to referencing in detail each one of FIGS. 5-8, the following features may apply to any of the components or systems described in FIGS. 5-8: (a) The gateway 300 shown in FIGS. 5-8 may be generally similar to gateway 300 of FIG. 3A; and may exchange analog signals with a V.34 call fax, and may further communicates with a remote gateway or IP fax via the IP network 30. (b) Analog signal exchange of the gateway 300 to/from connected V.34 fax may be performed in accordance with T.30, T.38, and content of T.38 packets exchanged with or through the T.38 session controller 305. (c) T.38 packet names are shown in syntax similar to the T.38 syntax. (d) According to T.30, the use of High-level Data Link Control (HDLC) protocol is mandatory for T.30 control and V.34 fax image data; and therefore, the HDLC prefix may be omitted in names of T.38 data packets shown; for example, FCS-OK-Sig-End may represent HDLC-FCS-OK-Sig-End, whereas the V.21:data octets and V.34:data octets may be read as V.21:HDLC (data octets) and V.34:HDLC (data octets), respectively. (e) The V.17 TCF octets may be raw (non-ECM) data. (f) T.38-encoded V.21 FCS-OK-Sig-End packets closing the T.30 data stream may be shown but are not necessarily numbered. (g) The V.21 FCS-OK-Sig-End command may be transferred separately from, or may be attached to, V.21 data octets; and similarly, the V.21 FCS-OK-Sig-End command may be received from the IP network 30 as one command, or alternatively as a V.21 HDLC-FCS-OK command followed by V.21 HDLC-Sig-End command. (h) The T.30 or V.34 phases that are noted as states of T.38 controller (which does not perform analog signal processing) represent T.38 packet exchange related to the noted T.30 or V.34 phases.

Figure 5A:
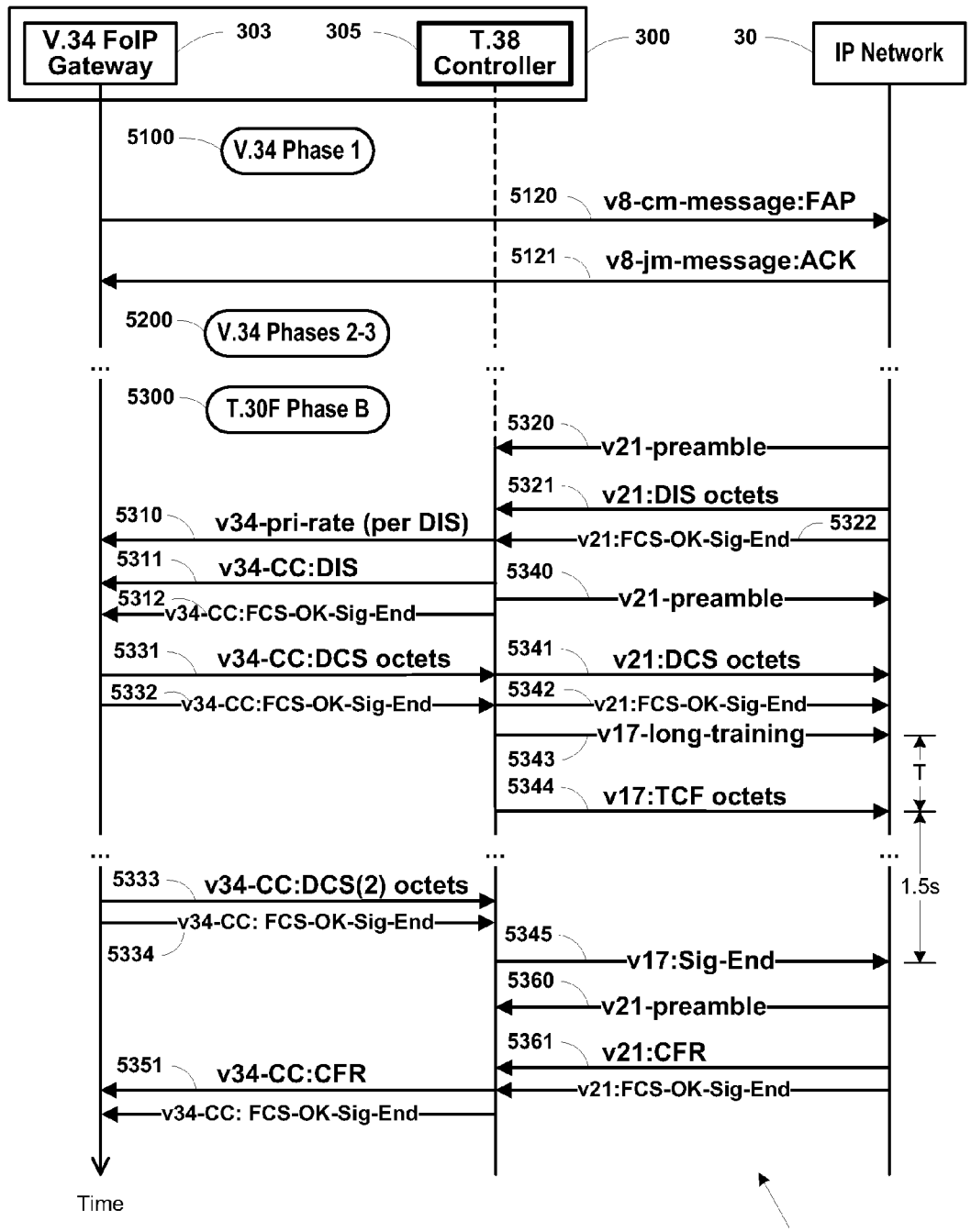
FIG. 5A is a schematic chart demonstrating phases in the operation of V.34 fax relay at a T.38 emitting side, in accordance with some demonstrative embodiments of the invention, during V.34 phases 1-3 and T.30F phase B.

Reference is made to FIG. 5A, which is a schematic chart 5000 demonstrating phases in the operation of V.34 fax relay at a T.38 emitting side, in accordance with some demonstrative embodiments, during V.34 phases 1-3 and T.30F phase B. For example, a remote gateway or IP fax side may be a T.38 receiving side.

In V.34 phase 1 (block 5100), the V.34 FoIP gateway 303 may exchange V.8 messages over the IP network 30 through the T.38 session controller 305. The gateway 303 may receive a V.34 CM signal from a connected V.34 call fax, and may send a V.8 CM message packet 5120 carrying a T.38 Facsimile Application Profile (FAP). As a response on the V.8 CM message packet, the T.38 session controller 305 may receive a V.8 JM message 5121 carrying a T.38 acknowledgement (ACK) of a remote gateway or IP fax.

If the gateway 303 is a V.34 capable gateway supporting all fax modulations, then the T.38 controller 305 may be transparent for the V.8 CM 5120 and V.8 JM 5121 messages. Upon receiving an ACK not reflecting V.34 support by a remote gateway or IP fax, the V.34 FoIP gateway 303 may switch to regular T.38 operation with the T.38 session controller 305 being substantially inactive or transparent until the end of the call.

However, if the gateway 303 is a V.34-only FoIP gateway, then, prior to sending the V.8 CM message to the IP network, the T.38 session controller 305 may replace the original FAP of the V.34-only gateway with a replacement FAP, denoted FAP', reflecting support for all fax modulations. For example, a FAP value of 5 (transmit fax, V.34-only) may be replaced with a FAP' value of 3 (transmit fax, V.34, V.17, V.29, V.27 ter, V.21); and a FAP value of 6 (receive fax, V.34-only) may be replaced with a FAP' value of 4 (receive fax, V.34, V.17, V.29, V.27 ter, V.21).

In the reverse direction, the T.38 session controller 305, prior to sending the V.8 JM message to the gateway 303, may replace an original acknowledgment ACK of V.8 JM message received from the IP network 30 with a replacement acknowledgment, denoted N2 (response for profiles 5 and 6), to be accepted by the V.34-only FoIP gateway 303 in order to continue a current V.34 fax call with a connected fax terminal.

The FAP and ACK replacements may be used in order to exclude incompatibility of V.34-only FoIP gateway 303 with a remote gateway or IP fax. Even if a remote side does not support the V.34 modulation, the gateway 300 may be T.38-controlled and may be able to communicate over the IP network 30 in a regular fax relay mode.

Upon completion of V.8 interaction (V.34 phase 1) with confirmed V.34 modulation, the gateway 303 may perform local termination of V.34 phases 2-3 (block 5200); and upon success, the gateway 303 may enter the T.30F phase B (block 5300). Once the V.8 message negotiation ends with the V.8 JM message A0 (response for profiles 3 and 4) received from remote gateway or IP fax, the T.38 session controller 305 may inspect a T.38 stream incoming from the IP network 30.

If the stream incoming from the IP network 30 is a normal T.38/V.34 stream, then the T.38 session controller 305 may transparently pass T.38 streams from and to the IP network directions. However, if the stream incoming from the IP network 30 is a regular T.38 stream starting with V.21-preamble packet 5320, then the T.38 session controller 305 may switch to asymmetric (e.g., T.38/V.34-T.38/V.17) packet exchange mode of operation. For example, the T.38 session controller 305 may exchange the T.38/V.34 streams with the V.34 FoIP gateway 303; and the T.38 session controller 305 may exchange regular T.38/V.17 streams with a remote gateway or IP fax over the IP network 30. For example, during the asymmetric fax relay, gateway 300 may perform the T.30/V.34 procedures with the connected V.34 fax terminal 10, but gateway 300 may communicate over the IP network 30 regular T.38 streams limited by V.17 modulation.

The T.38 session controller 305 may block the V.21-preamble 5320 as not supported by V.34 modulation, and the T.38 session controller 305 may wait for T.30 control data relayed over T.38 as V.21 data octets 5321. The T.38 session controller 305 may store and may delay the V.21 optional frames and final V.21 DIS frame, in order to avoid V.34 control channel data forwarding to the gateway 303 before V.34 primary rate packet 5310. Once the DIS frame is fully received (5322), the T.38 session controller 305 may generate a V.34 primary channel data signaling rate packet 5310 with a rate value according to a maximum data signaling rate transferred with V.21 DIS.

After the V.34 primary rate command, the T.38 session controller 305 may, for example: (a) adapt the binary content of the received DIS frame; (b) T.38-transcode the stored V.21 data as the V.34 control channel data; (c) forward the transcoded data packets 5311 to the V.34 FoIP gateway 303; and (d) generate a response T.38 V.21-preamble packet 5340 for a remote gateway.

Optionally, a suitable or preferred time point for performing the above operations (a) through (d) may be, for example, a time point which corresponds to a state of the gateway 303 in T.30F phase B (for example, in order to guarantee that the gateway 303 is ready to send a V.34 control channel DIS signal to a V.34 call fax) and, per T.30, within 1.5 seconds after the end 5322 of V.21 reception. In some embodiments, the T.38 session controller 305 may wait for a V.21 DIS retransmission in order to reach such suitable or preferred time point for performing the above operations (a) through (d).

In order to verify a completion of V.34 phase 3 which ends by a transition of a controlled gateway to the T.30F phase B, the T.38 session controller 305 may check this phase from status reports of attached gateway or/and may use, for example, a nominal duration of V.34 phases 2-3 of attached gateway.

As a response on the forwarded V.34 control channel DIS packets 5311-5312, the T.38 session controller 305 may receive V.34 control channel DCS packets 5331-5332 from the gateway 303. The T.38 session controller 305 may adapt the binary content of the received DCS frame to remote T.30/V.17 procedures, for example, by setting V.17 14,400 bps data signaling rate. The T.38 session controller 305 may then T.38-transcode the DCS as V.21 data, and may forward the T.38 V.21 packets 5341-5342 to the IP network 30.

According to a current T.38 session setup, the gateway 300 may utilize the data rate management method of transferred TCF. In such case, on completion of sending the DCS packets, the T.38 session controller 305 may send the command to train 5343 (for example, V.17 long training) and, on expiring the nominal time T of training, the T.38 session controller 305 may send TCF zero octets 5344 to the remote gateway over the IP network 30.

The T.38 controller 305 may block the T.38 stream 5333-5334 of next attempt(s) of T.30/V.34 DCS, for example, in order to avoid collision of fax relay streams exchanged over the IP network 30.

Upon completion of sending TCF octets (e.g., for a period of 1.5 seconds), the T.38 session controller 305 may send the T.38 signal end command 5345, and may wait for TCF confirmation (CFR) from the remote gateway.

The T.38 session controller 305 may ignore the T.38 V.21-preamble packet 5360, for example, since it may not be supported by V.34 modulation.

Figure 5B:
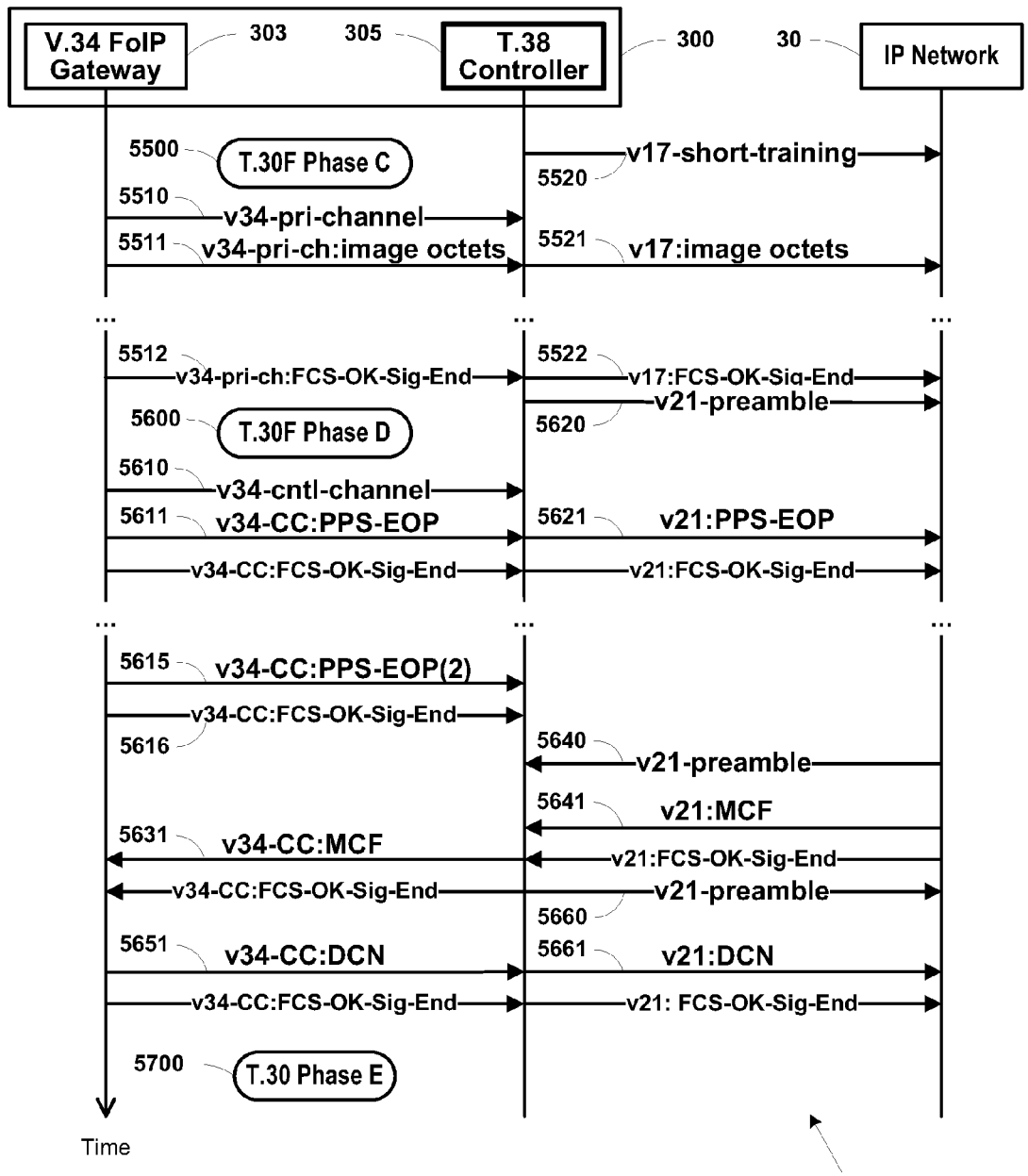
FIG. 5B is a schematic chart demonstrating phases in the operation of V.34 fax relay at a T.38 emitting side, in accordance with some demonstrative embodiments of the invention, from T.30F phase C until an end of the fax call.

Upon receiving the T.30 CFR frame 5361 from the IP network 30, the T.38 session controller 305 may immediately send the CFR as a V.34 control channel packet 5351 confirming the latest V.34 DCS received (e.g., packets 5333-5334); the T.38 session controller 305 may respond by a training indicator packet 5520, for example, V.17 short training of FIG. 5B, and the T.38 session controller 305 may switch to the T.30F phase C (block 5500) of fax image transfer.

The T.38 session controller 305 may perform data rate management. For example, instead of receiving an awaited CFR, the T.38 session controller 305 may receive a negative response T.30 Failure To Transmit (FTT) on the TCF stream 5343-5345 sent to the IP network 30. In such case, the T.38 session controller 305 may proceed by blocking the FTT, since this frame may not be allowed for V.34 modulation. However, in reaction to the received V.21 FTT, the T.38 session controller 305 may perform a next attempt of DCS/TCF transfer to the remote gateway by sending the T.38 streams 5340-5345 encoded with a fallback data signaling rate and optionally with a fallback modulation type. In parallel to such DCS/TCF transfer over T.38, the T.38 session controller 305 may renegotiate the V.34 primary channel data rate to the FoIP gateway 303 by means of T.38 indicator packet of V.34 control channel retrain followed by a V.34 primary rate packet with the rate value per data signaling rate of the latest V.21 DCS sent to the remote gateway.

Upon receiving the CFR frame packets 5360-5361, the T.38 session controller 305 may execute the steps 5351-5520 as described above.

Some embodiments may further handle a possible problem of T.38 data rate management during asymmetric fax relay, which may be in strong time limits relative to a regular T.38 fax relay.

For example, in case of regular fax relay, the data rate management in T.30 phase B may not be strongly limited in time. According to T.30, a call fax may be allowed to send up to three attempts of DCS/TCF at selected data rate and modulation type. If the TCF is rejected by answer side, then the call fax may repeat the DCS/TCF attempt or transmit a DCS/TCF with reduced data rate or/and changed modulation. For every fax rate, the call fax has three DCS/TCF attempts. Each TCF attempt takes 4÷8 sec including DCS/TCF transmission and receiving a response signal. Taking into account four data rates of V.17, two rates of V.29, and two rates of V.27 ter, a total time of data rate establishment may be long.

In case of asymmetric fax relay performed according to some embodiments, since receiving the first V.34 DCS packet stream 5331-5332 from the gateway 303, the T.38 session controller 305 has about 3*T4 (namely, 9 seconds) time window to complete a regular T.30 DCS/TCF data management with a remote gateway; the value of T4 may be 3 seconds as T.30 timeout of waiting the V.34 CFR response 5351 on V.34 DCS 5331; and the multiplier 3 may be a number of allowed V.34 DCS transmissions (original DCS plus two retransmissions). Finally, one or maximum two attempts of DCS/TCF are allowed.

To satisfy the strict requirements of V.34 modulation, the T.38 session controller 305 may be adapted for faster data rate management. The T.38 controller 305 may not use a regular method of fax rate fallback by 2,400 bps steps; and may not use DCS/TCF retransmission without fallback if a fallback is possible. A fallback of data signaling rate should be sufficiently strong, for example, after the first attempt of T.30 DCS/TCF done at V.17 14,400 bps; such that a subsequent next attempt may be performed at V.17 7,200 bps, or even at V.27ter 4,800 bps.

In addition to fast fallback between DCS/TCF attempts, the T.38 session controller 305 may be configured with a compromised modulation to be used as a limiter in case of asymmetric fax relay. By default, the T.38 session controller 305 may use the V.17 14,400 bps allowing all signaling rates declared in DIS. This modulation may be sufficient for most telephone lines. However, in case of probable rejections of DCS/TCF, the V.29 at 9,600 bps may be used as a compromised modulation instead of default V.17 14,400 bps modulation. The V.29 system has a very short training sequence, which may be important to improve a reliability of asymmetric fax relay by guaranteeing two DCS/TCF attempts: an initial attempt at V.29 9,600 bps, and a fallback attempt at V.27ter 4,800 bps.

Reference is made to FIG. 5B, which is a schematic chart 5999 demonstrating phases in the operation of V.34 fax relay at a T.38 emitting side, in accordance with some demonstrative embodiments, from T.30F phase C until an end of the fax call.

In the beginning of T.30F state C (block 5500), the V.34 FoIP gateway 303 may send the T.38 indicator packet of V.34 primary channel 5510. The T.38 session controller 305 may block this packet as it may be unsupported at the remote gateway or IP fax which uses a regular T.38 protocol.

The T.38 session controller 305 transcodes the V.34 primary channel data packets 5511 of the V.34 FoIP gateway 303 into regular T.38 image data packets, for example, V.17 image data packets 5521. The T.38 session controller 305 then forwards the regular T.38 stream transferring fax image data to the remote gateway over the IP network 30.

The final packet FCS-OK-Sig-End 5512 of V.34 primary channel may be transcoded as a final V.17 packet 5522 and may be forwarded to the IP network 30. The final packet may be followed by the generated T.38 indicator packet V.21-preamble 5620 to precede a T.30 post message command data. The gateway 303 and the T.38 session controller 305 may enter the T.30F phase D (block 5600) of post-message procedure.

The T.38 session controller 305 may block the T.38 indicator 5610 of V.34 control channel; may T.38-transcode the V.34 control channel PPS data 5611 into V.21 PPS data 5621; may transfer the transcoded PPS to the IP network 30; and may wait for the T.30 message confirmation (MCF) from the remote gateway.

While waiting for the MCF, the T.38 session controller 305 may block the packets 5615-5616 of one or more next attempt (s) of PPS, in order to avoid collision of fax relay streams exchanged over the IP network 30; and the T.38 session controller may ignore the V.21-preamble packet 5640 received from the remote gateway.

Upon receiving the V.21 MCF frame 5641 from the IP network 30, the T.38 session controller 305 may transcode the V.21 MCF frame 5641 as V.34 control channel MCF frame, and may forward the transcoded MCF 5631 to the V.34 FoIP gateway 303.

Generally, instead of T.30 PPS-EOP frame 5611 corresponding to the last partial page of a final fax image page, a T.30 PPS-NULL indicating non-final partial page or a PPS-MPS indicating a non final fax page may be received. In such case, the gateway 303 and the T.38 session controller 305 may return to T.30F phase C. For example, the gateway 303 may return to T.30F phase C automatically; whereas the T.38 session controller 305 may return to T.30F phase C by responding to the IP network 30 with a T.38 training indicator, e.g., V.17 short training, similar to 5520.

Upon completion of T.30 MCF transfer 5641 confirming the last partial page of a final fax page, the T.38 session controller 305 may respond to a remote gateway or IP fax over the IP network 30 by the T.38 indicator packet V.21-preamble 5660, and may wait for T.30 DCN (disconnect) frame from the V.34 FoIP gateway 303. The T.30 DCN packet(s) 5651 of V.34 control channel may be relayed over the IP network 30 as the V.21 DCN packet(s) 5661. The T.38 session controller 305 may stop operation. On completion of V.34 control channel transmission, the gateway 303 may physically disconnect from a V.34 call fax and may normally close the T.38 session. The fax call may thus successfully end in T.30 phase E (block 5700).

Figure 6A:
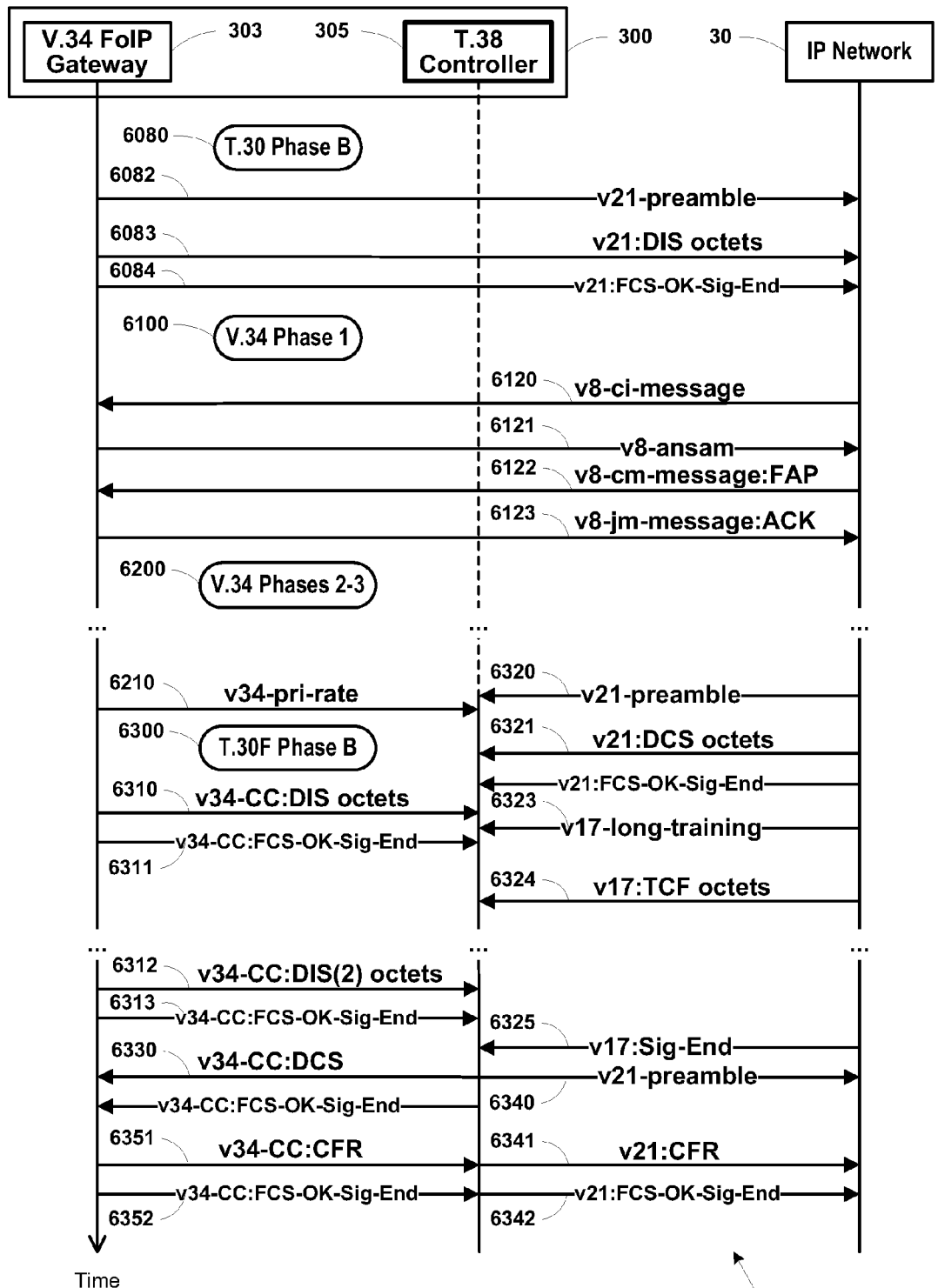
FIG. 6A is a schematic chart demonstrating phases in the operation of V.34 fax relay at a T.38 receiving side, in accordance with some demonstrative embodiments of the invention, during V.34 phases 1-3 and T.30F phase B.

Reference is made to FIG. 6A, which is a schematic chart 6000 demonstrating phases in the operation of V.34 fax relay at a T.38 receiving side, in accordance with some demonstrative embodiments, during V.34 phases 1-3 and T.30F phase B. For example, a remote gateway or IP fax side may be a T.38 emitting side.

In regular T.30 phase B (block 6080), the T.38 FoIP gateway 303 may receive the V.21 preamble flags and DIS signals from a connected answer fax; and may relay corresponding V.21-preamble 6082 and V.21 DIS data packets 6083-6084 to a remote gateway over the IP network 30 through the T.38 session controller 305. This stream may transparently pass the T.38 session controller 305, since V.34 modulation may not yet be active.

With receiving V.8 CI message packet 6120 transferring a facsimile call function from a remote gateway or IP fax over the IP network 30, the V.34 FoIP gateway 303 and the T.38 session controller 305 may start a V.34 phase 1 (block 6100). The V.8 packets 6120 (V.8 CI) and 6121 (V.8 ANSam) may transparently pass the T.38 session controller 305. If the gateway 303 is a V.34 capable gateway supporting all fax modulations, then the T.38 session controller 305 may be transparent also for the V.8 CM 6122 and V.8 JM 6123 messages.

If the gateway 303 is a V.34-only FoIP gateway, then the T.38 session controller 305 may replace the original FAP of V.8 CM message packet received from the IP network onto the FAP' reflecting a support of the only V.34 half-duplex modulation: for example, an odd (transmit) FAP may be replaced by FAP' having a value of 5, whereas an even (receive) FAP may be replaced by a FAP' having a value of 6.

In reverse direction from gateway 303 to the IP network 30, the original acknowledgment (ACK) N2 of V.8 JM message packet 6123 received from the V.34-only FoIP gateway 303 may be replaced with ACK', based on the original FAP received from the IP network 30. For example, an original FAP value of 1 or 2 may cause replacement of ACK with ACK' having value of N1; an original FAP value of 3 or 4 may cause replacement of ACK with ACK' having value of A0; and an original FAP value of 5 or 6 may cause replacement of ACK with ACK' having value of N2.

The above-mentioned FAP and ACK replacements may be performed in order to exclude incompatibility of V.34-only FoIP gateway 303 with a remote gateway or IP fax. For example, even if a remote side does not support V.34 modulation, the gateway 300 may be T.38-controlled and thus may be able to communicate over the IP network 30 in regular fax relay mode.

Subsequent to successful V.8 message exchange, the T.38 session controller 305 may inspect the T.38 stream which arrived from a remote gateway or IP fax over the IP network 30. The V.34 FoIP gateway 303 may start an autonomous signal exchange (block 6200) according to V.34 phases 2-3 with a connected V.34 answer fax, and may later enter the T.30F phase B (block 6300).

If the stream incoming from the IP network 30 is a normal T.38/V.34 stream, then the T.38 session controller 305 may transparently pass T.38 streams from and to the IP network directions. However, if a regular T.38 stream started with V.21-preamble packet 6320 arrived, then the T.38 session controller 305 may switch to asymmetric (e.g., T.38/V.34-T.38/V.17) packet exchange: for example, the T.38 session controller 305 may exchange the T.38/V.34 streams with the V.34 FoIP gateway 303, and may exchange regular T.38/V.17 streams with a remote gateway or IP fax over the IP network 30. For example in the FoIP environment of FIG. 3A, during asymmetric fax relay, the gateway 300 may perform the T.30/V.34 procedures with the connected V.34 fax terminal 10; whereas the gateway 300 may communicate regular T.38 streams limited by V.17 modulation over the IP network 30.

The T.38 session controller 305 may block the V.21-preamble packet 6320 (which may be unsupported by V.34 modulation); and may block the V.34 primary channel rate packet 6210 (which may be unsupported by a regular T.38 protocol).

The T.38 session controller 305 may store the regular T.38 V.21 data 6321, transferring T.30 optional frames and a final DCS frame; and may delay these frames until completion of DCS/TCF data rate management.

If according to a current T.38 session setup the data rate management method of transferred TCF is selected, then the T.38 session controller 305 may receive the TCF stream 6323-6325; otherwise, a suitable TCF stream may be assumed to be available.

The T.38 session controller 305 may block the TCF stream as unsupported by V.34 modulation; but may check the TCF octets: Per regular T.30 procedures, the TCF signal should carry 1.5 seconds (plus, or minus, ten percent) of continuous zeroes.

In T.30F phase B, the T.38 session controller 305 may receive V.34 control channel DIS data 6310-6311, and may receive one or more retransmitted DIS streams 6312-6313. The T.38 session controller 305 may neither transcode nor relay the V.34 control channel DIS as well optional frames preceding the DIS frame.

At the end of TCF stream 6325, the T.38 session controller 305 may send a V.21-preamble packet 6340 to the remote gateway. This V.21-preamble may precede a T.30 response on the received DCS/TCF data.

If the received TCF is appropriate (e.g., if the T.38 session controller 305 received enough continuous zeroes from the TCF stream 6324), and if a local data signaling rate is higher than or equal to the data signaling rate transferred in relayed DCS frame 6321, then the T.38 session controller 305 may complete the data rate management by performing the following operations: (a) retrieving the DCS with optional frames stored on receiving V.21 data 6321; (b) adapting the DCS frame content to the local T.30/V.34 procedures, for example, by clearing data signaling rate bit field; (c) T.38-transcoding and forwarding the V.34 control channel packets 6330 to the V.34 FoIP gateway 303; (d) upon receiving the V.34 control channel CFR packets 6351-6352, T.38-transcoding the packets and relaying the V.21 CFR 6341-6342 to the remote gateway or IP fax over the IP network 30; (e) switching to T.30F phase C of fax image transfer.

Otherwise, for example when TCF is not appropriate, then the T.38 session controller 305 may perform a TCF rejection procedure, by sending the V.21 FTT (TCF rejection) frame to a remote gateway, and waiting for a new DCS/TCF stream similar to 6320-6325 but based on a lower data signaling rate. The TCF rejection procedure may be repeated while a received TCF may not be appropriate, or if a local data signaling rate is lower relative to the data signaling rate transferred in relayed V.21 DCS frame.

Figure 6B:
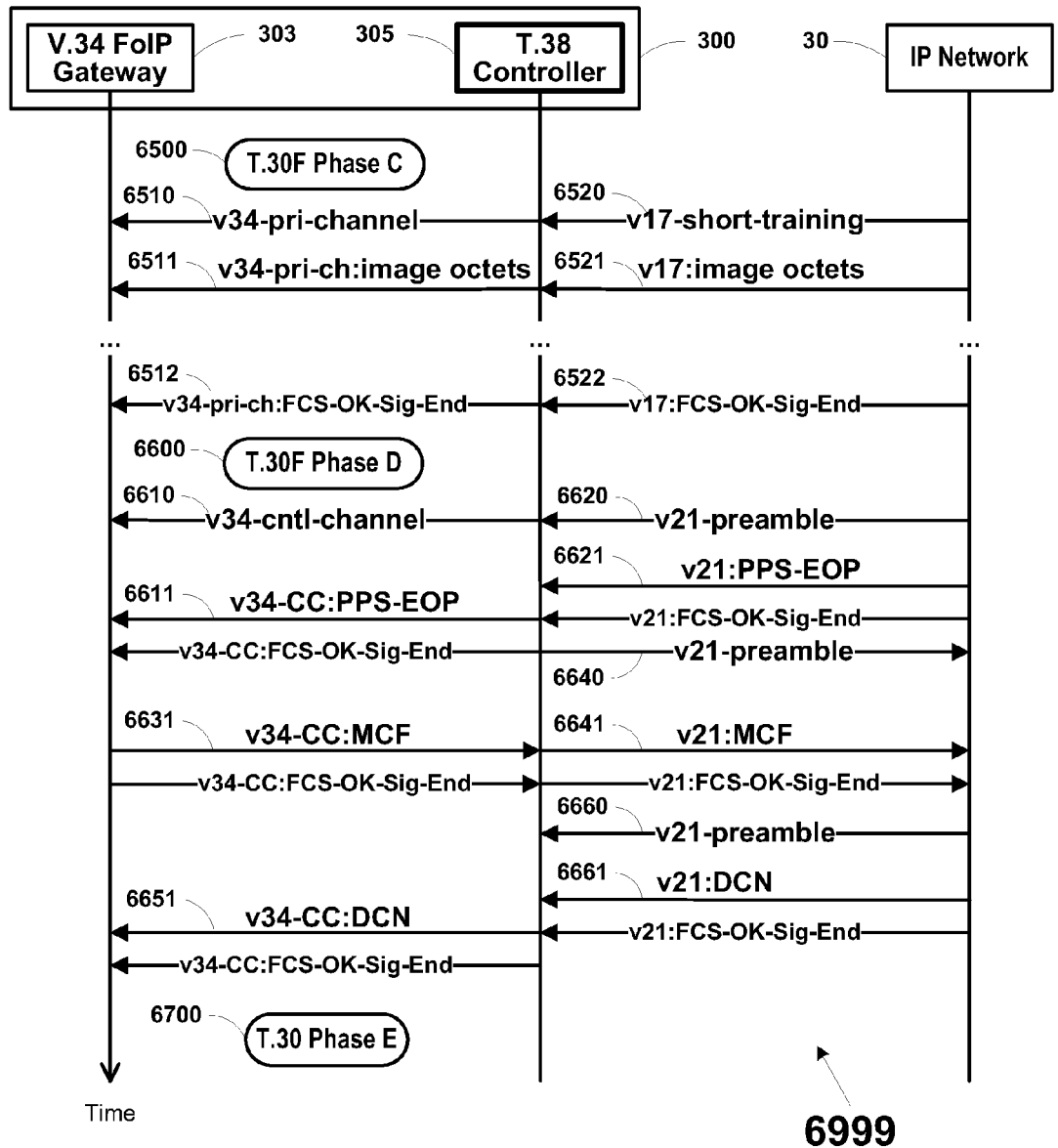
FIG. 6B is a schematic chart demonstrating phases in the operation of V.34 fax relay at a T.38 receiving side, in accordance with some demonstrative embodiments of the invention, from T.30F phase C until an end of the fax call.

Reference is made to FIG. 6B, which is a schematic chart 6999 demonstrating phases in the operation of V.34 fax relay at a T.38 receiving side, in accordance with some demonstrative embodiments, since T.30F phase C until an end of the fax call. For example, a remote gateway or IP fax side may be a T.38 emitting side.

In T.30F phase C (block 6500), the T.38 session controller 305 may T.38-transcode the regular fax image packets 6520-6522 received from the IP network 30 into the V.34 primary channel packets 6510-6512 forwarded to the V.34 FoIP gateway 303.

Typically, the image transfer over the IP network 30 may end by a FCS-OK-Sig-End command 6522. Both the gateway 303 and the T.38 session controller 305 may switch to the T.30F phase D (block 6600) of post-message procedure.

The T.38 session controller 305 may replace the received V.21-preamble packet 6620 by a V.34 control channel indicator 6610; and may wait for T.30 PPS frame from the IP network 30.

Upon receiving the V.21 PPS frame 6621 from the IP network 30, the T.38 session controller 305 may T.38-transcode it, may forward it as a V.34 control channel PPS frame to the gateway 303, and may respond with V.21-preamble packet 6640 to a remote side. A post-message response 6631 of the gateway 303 may be T.38-transcoded as V.21 data frame 6641, and may be sent to the remote gateway.

In case of non-final partial page, when the V.21 PPS-NULL or PPS-MPS is received instead of V.21 PPS-EOP 6621, the T.38 session controller 305 may return to operation 6500-6641.

Upon completion of T.30 MCF transfer 6641 confirming the last partial page of a final fax page, the T.38 session controller 305 may wait for V.21 DCN frame from the remote gateway or IP fax.

The T.38 session controller 305 may block the V.21-preamble packet 6660; and then may T.38-transcode and transfer the V.21 DCN frame 6661 as V.34 control channel DCN 6651 to the FoIP gateway 303, and may stop operation. Upon completion of V.34 control channel DCN transmission, the gateway 303 may physically disconnect from a V.34 answer fax and may normally close the T.38 session. The fax call may thus successfully end in T.30 phase E (block 6700).

Optionally, a V.34-only gateway communicating with a regular fax relay gateway or regular IP fax over the IP network 30 through the T.38 session controller 305 may have specific T.30 DCS/TCF data rate management. For example, asymmetric (e.g., T.38/V.34-T.38/V.17) packet exchange may be established at the T.38 session controller 305 since T.38 session setup; and V.8 messages of V.34 phase 1 may not be relayed over the IP network 30 but rather may be locally exchanged between the V.34-only gateway and the T.38 session controller 305.

Figure 7:
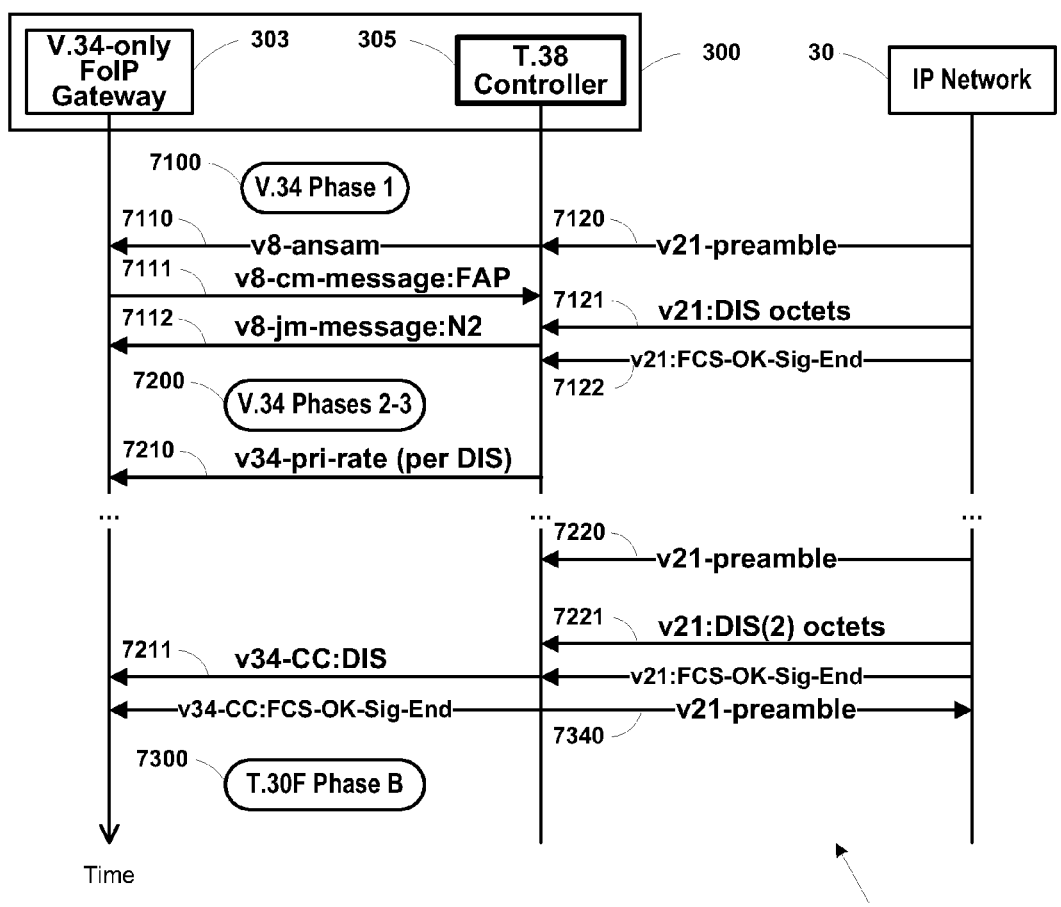
FIG. 7 is a schematic chart demonstrating phases in fax relay from a V.34-only T.38 emitting gateway to a regular T.38 gateway or IP fax, in accordance with some demonstrative embodiments of the invention, during V.34 phases 1-3 and T.30F phase B.

Reference is made to FIG. 7, which is a schematic chart 7000 demonstrating phases in fax relay from a V.34-only T.38 emitting gateway to a regular T.38 gateway or IP fax, in accordance with some embodiments, during V.34 phases 1-3 and T.30F phase B. The remote gateway or IP fax side may be assumed to be a T.38 receiving side.

As shown at V.34 phase 1 (block 7100), upon receiving a V.21-preamble packet 7120 from the remote gateway or IP fax, the T.38 session controller 305 may replace the V.21-preamble packet 7120 by a V.8 ANSam packet 7110, and may forward it to the V.34-only FoIP gateway 303. In response to the packet 7110, the gateway 303 may start V.34 phase 1 signal interaction with a connected V.34 call fax. The T.38 session controller 305 may receive a V.8 CM message packet 7111, and may confirm the V.34-only profile FAP by V.8 JM message N2 packet 7112.

The T.38 session controller 305 may block the V.21 DIS packets 7121-7122 relayed from the remote gateway; and may wait for DIS retransmission. This blocking may allow the V.34 FoIP gateway 303 to pass V.34 phases 2-3 (block 7200).

The T.38 session controller 305 may send a V.34 primary rate packet 7210 to the gateway 303, according to a maximum data signaling rate transferred by V.21 DIS 7121 from a remote side.

To verify completion of V.34 phase 3, which may end by transition of the controlled gateway 303 to the T.30 phase B (block 7300), the T.38 session controller 305 may check this phase from status reports of attached gateway or/and may use, for example, a nominal duration of V.34 phases 2-3 of the attached gateway 303.

Optionally, the T.38 session controller 305: (a) may block the V.21-preamble packet 7220; (b) may adapt the binary content of the received V.21 DIS frame 7221; (c) may T.38-transcode the V.21 data packets 7221 as the V.34 control channel data; (d) may forward the transcoded data packets 7211 to the V.34 FoIP gateway 303; and (e) may send a T.38 V.21-preamble packet 7340 to the remote gateway, and may begin T.30 DCS/TCF data rate management.

From the time point of receiving V.34 control channel data packets from the V.34 FoIP gateway 303 and onward, the T.38 session controller 305 may perform operations which may be similar to the operations described with reference to FIG. 5A (starting at the V.34 control channel DCS 5331, and onward) and FIG. 5B.

Optionally, V.21 DIS retransmission, which may be required in the scenario of FIG. 7, may be avoided. For example, the T.38 session controller 305 may start the V.8 interaction (block 7100) before the V.21-preamble packet 7120; particularly, for example, the T.38 session controller 305 may start the V.8 packet exchange upon receiving the T.38 CED indicator packet from the IP network 30.

Reference is made to FIG. 8, which is a schematic chart 8000 demonstrating phases in fax relay from a V.34-only T.38 receiving gateway to a regular T.38 gateway or IP fax, in accordance with some embodiments, during V.34 phases 1-3 and T.30F phase B. The remote gateway or IP fax side may be assumed to be a T.38 emitting side.

The V.34-only FoIP gateway 303, operating at V.34 answer fax side, may start the T.38 session with an optional V.8 ANSam indicator packet 8071 or with a regular V.21-preamble indicator packet 8081. The T.38 session controller 305 may replace the first T.38 packet received from the gateway 303 with a T.38 No-Signal indicator packet 8072. The T.38 controller 305 may block the V.21 packets 8081-8083 of T.30 phase B (block 8080), together with storing the data octets 8082 to avoid receiving the T.30 DCS/TCF stream from the remote gateway or IP fax before V.34 phases 2-3 (block 8200).

Upon completion of V.21 stream from the V.34 FoIP gateway 303, the T.38 session controller 305 may start the V.34 phase 1 (block 8100) of V.8 interaction by sending a V.8 CI message packet 8110 to the gateway 303. The V.8 ANSam indicator packet 8111 may be transcoded as a regular CED indicator packet 8121, and may be forwarded to the remote gateway or IP fax over the IP network 30.

Upon receiving the acknowledgement V.8 JM message 8113 on V.8 CM message 8112, the T.38 session controller 305 may retrieve the stored V.21 data 8082, may forward the V.21 DIS frame (together with preceding optional frames) 8123-8125 to the IP network 30, and may start a regular T.38 data rate management similar to that of FIG. 6A.

The V.34 FoIP gateway 303 may autonomously pass the V.34 phases 2-3 (block 8200), which may end with receiving a V.34 primary channel rate packet 8210 to be blocked by the T.38 session controller 305; and the V.34 FoIP gateway may enter the T.30F phase B (block 8300).

The remote gateway or IP fax may respond with V.21 DCS packets 8140-8142, and optionally with T.30 TCF packets 8143-8145, depending on a selected method of T.38 data rate management.

Upon receiving the V.34 control channel DIS frame 8310-8311 from the gateway 303, the T.38 session controller 305 may perform operations which may be similar to the operations described with reference to FIG. 6A (starting with the V.34 DCS transmission 6330, and onward) and FIG. 6B.

Reference is made to FIG. 9, which is a schematic block diagram illustration of a T.38 session controller 9000 in accordance with some embodiments of the invention. The T.38 controller labeled as 9100 may be a demonstrative implementation of the T.38 session controller 305 of FIGS. 3A and/or 3B. Being linked between T.38-over-IP packet interfaces 9010 and 9020, the T.38 controller 9100 may demonstrate an externally implemented T.38 session controller 355 of FIG. 3B.

As an overview of FIG. 9, it may be noted that the T.38 session controller 9000, or the T.38 controller 9100, may be implemented by using multiple modules and sub-units. In one demonstrative implementation, a first set of sub-units and modules may operate as a first converter; whereas a second set of sub-units and modules may operate as a second converter. The first converter may convert non-V.34 modulation fax relay streams incoming from an IP network into V.34 fax relay streams, and may forward the converted V.34 fax relay streams to a V.34 fax relay gateway. The second converter may convert output V.34 fax relay streams of said V.34 fax relay gateway into non-V.34 modulation fax relay streams, and may forward the converted non-V.34 fax relay streams to a remote device over the IP network. The first and second converters may be implemented, for example, using the components described herein.

If a local V.34 FoIP gateway (shown as T.38 V.34 GW) under control is capable of regular G3 fax relay, and the remote FoIP gateway, or IP fax, or fax terminal equipment do not support V.34 modulation, then, T.38/V.17 packets 9101 may bypass (e.g., may transparently pass through) the T.38 session controller 9000 through a bypassing means.

Further, if a local V.34 FoIP gateway under control and a remote FoIP gateway or IP fax operate by using V.34 modulation without a fallback to regular G3 fax procedures, then, T.38/V.34 packets 9102 may bypass (e.g., transparently pass through) the T.38 session controller 9000.

In case of externally implemented T.38 session controller, the streams 9101 and 9102 may also bypass (9011 and 9021) the T.38 packet interfaces 9010 and 9020 and may avoid T.38 re-packetization.

T.38/V.8 packet exchange 9103 and 9105 may be performed under a T.38/V.8 control module 9110, which may monitor V.8 packets, and may optionally update or generate the T.38/V.8 packets.

Mutual adaptation and conversion of T.38/V.34 streams 9104 into/from fallback T.38/V.17 streams 9106 may be performed on the way of adaptation path 9199 managed by a state machine 9120 in accordance with a T.30 phase decision 9130 of the T.38 session controller 9100.

In the demonstrative implementation of T.38 controller 9100 which may correspond to the T.38 session controller 305 shown in FIGS. 3A and 3B, a suitable T.38 protocol of packets 9104 and 9106 may be, for example, T.38 Internet Facsimile Protocol (IFP), and packets 9104 and 9106 may be T.38 IFP primary packets.

In a demonstrative external implementation of the T.38 session controller 9000 (e.g., similar to the implementation shown in FIG. 3B), T.38 packet exchanges 9012 and 9022 between the T.38 session controller, local gateway and the IP network, may be performed, for example, by using a T.38 over User Datagram Protocol Transport Layer (T.38 UDPTL/UDP/IP) protocol. Other suitable T.38 protocol may be used according to a T.38 session setup, for example, a T.38 protocol encapsulated into a Real-time Transport Protocol (T.38 RTP/UDP/IP). Furthermore, the protocols of two interfaces 9010 and 9020 may differ from each other, for example, the packet exchange 9012 may be performed by using T.38 UDPTL/UDP/IP, while the packet exchange 9022 by using T.38 RTP/UDP/IP, or vice versa; other suitable protocols and/or encapsulations may be used.

In a demonstrative internal implementation of the T.38 session controller 9000 (e.g., similar to the implementation shown in FIG. 3A), the T.38 packet interface 9010 may be excluded, and internal communication between the T.38 session controller and a gateway unit responsible for V.34 fax relay may be performed by using T.38 IFP primary packets 9104. The T.38 packet interface 9020 between the T.38 controller and the IP network may be common for two internal blocks of media gateway: a V.34 FoIP gateway unit, and the T.38 session controller. In such case, T.38 packetization of output packets and de-packetization of input packets may be applied only at packet output and input of the media gateway.

The state machine 9120 may be responsible for selecting and switching paths of T.38 packets according to fax relay stream types and T.38 controller states: bypass (transparent) path 9101 for T.38/V.17 streams, bypass (transparent) path 9102 for T.38/V.34 streams, V.8 packet path 103-105 for monitoring and control, and adaptation path 9199 for mutual conversion of T.38/V.34 stream 9104 into/from T.38/V.17 stream 9106. Inspecting the types of fax relay streams incoming from the IP network, the state machine 9120 may detect a fallback from V.34 modulation to non-V.34 modulation: For example, if in a state of V.34 phase 2, 3, or T.30F phase B, the V.21 preamble and/or V.21 data packet(s) are received from the IP network, then the state machine 9120 may close or deactivate the transparent bypass paths 9101, 9102 and may open or activate the adaptation path 9199.

The T.38 controller state machine 9120 may control one or more sub-units or modules of the T.38 session controller 9100 according to the T.30 phase. In some embodiments, optionally, one or more operations of the T.38 controller state machine 9120 may be performed by other sub-units or modules; for example, optionally, a modulation fallback detector may inspect the fax relay streams incoming from the IP network to detect fallback from V.34 modulation to non-V.34 modulation; and a signal indicating the detected modulation fallback may be used by one or more other components of the T.38 session controller 9000.

The T.30 phase decision 9130 may be obtained from the V.34 FoIP gateway unit, as the T.30 phase of the FoIP gateway unit (e.g., in case of the T.38 session controller 9100 being built into the FoIP gateway); and/or by analyzing T.30 indicator/data packets (e.g., by a T.30 frame analyzer 9140) which may be exchanged in both directions over the T.38 controller 9100.

The adaptation path 9199 of the T.38 session controller 9100 may include alternative, parallel and/or consequent operation of sub-units or modules of the T.38 controller 9100 in order to perform the operations described above with reference to FIGS. 4 to 8. For example, a T.38/V.34 transcoder 9141 and a T.38/V.17 transcoder 9142 may perform transcoding of the T.30 indicator and T.30 data packets, with or without optionally modifying the T.38 data octets.

Delayed T.30 frames 9150 may be used for time alignment of T.38/V.34 and T.38/V.17 streams. The time alignment units 9151 and 9152 may serve for T.30 time compliant forwarding T.38/V.34 streams to the controlled gateway and T.38/V.17 streams to the IP network. Optionally, the time alignment of T.38/V.17 streams may have two alternative modes: normal mode, or reduced operational mode for communication over the IP network with FoIP gateway or IP fax, respectively. For example, if according to V.21 DIS or DCS frame received from a remote side, the remote fax is an Internet-aware fax, then time alignment of T.38 streams forwarded to the IP fax may be not important and may not be performed.

A collision avoidance module 9160 may block the retransmitted V.34 fax relay streams of the V.34 FoIP gateway to avoid a collision of fax relay streams exchanged over the IP network.

A T.38/V.34 deletion unit 9161 (or a blocker) may block T.38 packets which cannot be transcoded into T.38/V.17 packets. Similarly, a T.38/V.17 deletion unit 9162 (or a blocker) may block T.38 streams which cannot be transcoded into T.38/V.34 streams.

A T.38/V.34 generator 9171 may emit T.38 packets which may be required by V.34 modulation, if such packets are not relayed to the T.38 session controller 9100. Similarly, a T.38/V.17 generator 9172 may emit T.38 packets required by regular G3 fax modulation, if such packets are not relayed to the T.38 session controller 9100.

A T.38 fax rate control unit 9170 may perform T.38 data rate management. For example, in a direction toward the source or destination of regular T.38/V.17 stream 9006, the T.38 fax rate control unit 9112 may be responsible for T.30

TCF octet processing and appropriate data signaling rate transferred by V.21 DCS frame. The T.38 fax rate control unit 9112 may perform a compromised management of data signaling rate of non-V.34 fax relay over the IP network. For example, a first compromise may be in the use of TCF data rate step down which may be higher relative to a conventional step down of 2,400 bps of conventional fax relay. Another compromise may be in the use of V.29 modulation instead of normal V.17 modulation for initial T.30 TCF relayed after the V.34-to-V.17 fallback. A compromised modulation for initial TCF may be configured by a user or by an external application, for example, according to an analysis of statistics of fax relay calls. Taking into account a short duration of V.34 control channel signal exchange, both compromises may be based on priority between fax relay session duration (e.g., V.17 has higher data rate than V.29) and fax relay reliability which may depend on success of initial TCF (e.g., V.29 has shorter training that V.17 and may be more reliable, including a further fallback to V.27). Optionally, in some embodiments, one or more operations performed by the T.38 fax rate control unit 9170 may be performed by another sub-unit or module, for example, a compromiser module.

Optionally, the T.38 controller 9100 may include a controller, a processor, circuitry, or other logic or units able to perform one or more other operations which are described herein by generally refereeing to the T.38 session controller 305. Optionally, the T.38 controller 9100 may include one or more additional sub-units or modules to perform such operations; for example, a T.38 Modified Modified Read (MMR) transcoder for communication of V.34-only gateway over IP with non-ECM fax.

Some embodiments may be used for operation of asymmetric (e.g., T.30/V.34-T.38/V.17) fax relay for other scenarios, for example, retransmission of image error frames, fallback of data signaling rate at a remote gateway during T.30 phase D, fax polling, or the like.

Some embodiments may provide a method and a system of real-time fax relay from V.34 to a fallback modulation for a gateway; while the gateway may be capable of operating with fax terminal equipment in accordance with V.34 modulation but forced to communicate over the Internet Protocol (IP) network with a remote gateway or Internet-aware fax device (IP fax) by means of regular (non-V.34) fax relay packets. Some embodiments may be useful for resolving V.34 fax relay problem(s) which may occur when one of two V.34-capable gateways, which may communicate by using the V.34 fax relay protocol, performs real-time fallback to a regular fax relay protocol not based on the V.34 modulation; whereas the other side gateway already entered a V.34 phase, thereby not allowing a fallback to regular fax procedures. Some embodiments may further resolve incompatibility problem(s) of V.34-only gateways which may be forced to communicate over the IP network with fax relay gateways not supporting V.34 modulation or with an IP fax not supporting the V.34 fax relay protocol.

Optionally, the gateway may include the following FoIP features and/or components: (a) Link to a fax terminal equipment over switched network through an analog signal interface; (b) Link to a remote gateway or IP fax over the IP network through a network packet interface; (c) At least V.34 modulation support, and optionally, regular fax modulations support; (d) At least a T.30-compliant analog signal processing for V.34 modulation, and optionally, regular T.30 analog signal processing; (e) T.38 compliant encoding, packetization, de-packetization, and decoding per T.38 versions 0 through 3 or higher; (f) T.38 packet recovery and re-ordering of T.38 packets arrived in wrong sequence; (g) Ability to setup a T.38 session with a remote gateway or IP fax, for example, once the gateway is physically connected to fax terminal equipment, or when the gateway detects at least one of the regular stimulus signals from a connected V.34 fax (e.g., T.30 CNG; or V.8 ANSam; or V.8 CM; or V.21 preamble flags); (h) Ability to carry out the established T.38 session of normal V.34 fax relay and optionally of regular G3 fax relay.

Although some of the charts in the drawings may include, for demonstrative, a time axis, such time axis may merely reflect operation (e.g., in real time), and does not reflect any time scale or time units.

Other suitable operations or sets of operations may be used in accordance with some embodiments. Some operations or sets of operations may be repeated, for example, substantially continuously, for a pre-defined number of iterations, or until one or more conditions are met. Some operations may be performed in parallel, in sequence, or in other suitable orders of execution Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Discussions herein utilizing terms such as, for example, "processing," "computing", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:
1. A fax relay apparatus comprising:
    a fax relay session controller comprising:
        a first converter to convert non-V.34 fax relay streams which are based on non-V.34 modulation and which are incoming from an Internet Protocol (IP) network into V.34 fax relay streams and to forward the converted V.34 fax relay streams to a V.34 fax relay gateway; and a second converter to convert output V.34 fax relay streams of said V.34 fax relay gateway into non-V.34 fax relay streams which are based on non-V.34 modulation and to forward the converted non-V.34 fax relay streams which are based on non-V.34 modulation to a remote device over the IP network;

wherein the first converter comprises:

a first transcoder to transcode non-V.34 fax relay packets into V.34 fax relay packets;

a first deletion unit to block non-V.34 fax relay packets which cannot be transcoded into V.34 fax relay packets;

a first packet generator to generate V.34 fax relay packets which are required by V.34 fax relay procedures and are disallowed by non-V.34 fax relay procedures; and a first time alignment unit to align in time the V.34 fax relay streams before forwarding the V.34 fax relay streams to the V.34 fax relay gateway;

wherein the first transcoder, the first deletion unit, the first packet generator, and the first time alignment unit are operative to convert the incoming non-V.34 fax relay streams into V.34 fax relay streams.

2. The fax relay apparatus of claim 1, wherein the second converter comprises:

a second transcoder to transcode V.34 fax relay packets into non-V.34 fax relay packets;

a second deletion unit to block V.34 fax relay packets which cannot be transcoded into non-V.34 fax relay packets;

a stream generator to generate non-V.34 fax relay streams which are required by non-V.34 fax relay procedures and are disallowed by V.34 fax relay procedures;

a collision avoidance unit to block the retransmitted V.34 fax relay streams of said V.34 fax relay gateway and to avoid collision of fax relay streams exchanged over the IP network; and a second time alignment unit to align in time the non-V.34 fax relay streams before forwarding the non-V.34 fax relay streams to the IP network;

wherein the second transcoder, the second deletion unit, the second packet generator, the collision avoidance unit, and the second time alignment unit are operative to convert output V.34 fax relay streams of said V.34 fax relay gateway into non-V.34 fax relay streams.

3. The fax relay apparatus of claim 1, wherein the fax relay session controller comprises:

a V.8 control unit to perform V.8 message exchange adapted to avoid fax relay disconnection due to incompatibility of a first fax modulation selected by the V.34 fax relay gateway and a second fax modulation selected by the remote device.

4. The fax relay apparatus of claim 1, wherein the fax relay session controller comprises:

a fax data rate control module to perform compromised management of data signaling rate of non-V.34 fax relay over the IP network, by compromising between fax relay session duration and fax relay reliability, and by taking into account a short duration of V.34 control channel signal exchange.

5. The fax relay apparatus of claim 1, wherein said fax relay session controller and said V.34 fax relay gateway are linked internally within a single gateway.

6. The fax relay apparatus of claim 1, wherein the fax relay session controller is external to a media gateway which comprises said V.34 fax relay gateway.

7. The fax relay apparatus of claim 1, wherein the fax relay session controller comprises:

a bypassing means for passing-through one or more fax relay streams which correspond to a same modulation used by both the V.34 fax relay gateway and the remote device.

8. The fax relay apparatus of claim 1, wherein the fax relay session controller comprises:

a V.8 control unit to detect V.8 packet exchange completed with an acknowledged V.34 fax application profile.

9. The fax relay apparatus of claim 1, wherein the fax relay session controller comprises:

a state machine module to inspect the fax relay streams exchanged over the IP network, to apply bypassing means for passing-through one or more fax relay streams which correspond to a same modulation used by both the V.34 fax relay gateway and the remote device, to detect fallback from V.34 modulation to non-V.34 modulation, and to activate and control conversion of fax relay streams when a fallback from V.34 modulation to non-V.34 modulation is detected but said V.34 fax relay gateway cannot already accept the non-V.34 fax relay streams.

10. The fax relay apparatus of claim 1, wherein the fax relay session controller is adapted to operate at V.34 fax call side.

11. The fax relay apparatus of claim 1, wherein the fax relay session controller is adapted to operate at V.34 fax answer side.

12. The fax relay apparatus of claim 1, wherein the fax relay session controller is linked to said V.34 fax relay gateway, and wherein the V.34 fax relay gateway is a V.34-only fax relay gateway.

13. The fax relay apparatus of claim 1, wherein the fax relay session controller is to initiate, immediately upon fax relay session setup, conversion of incoming non-V.34 and outgoing V.34 fax relay streams into incoming V.34 and outgoing non-V.34 fax relay streams, respectively.

14. The fax relay apparatus of claim 1, wherein the remote device is selected from the group consisting of: a remote gateway, and an Internet-aware fax device.

15. The fax relay apparatus of claim 1, wherein the fax relay apparatus is a gateway which comprises said fax relay session controller and said V.34 fax relay gateway which are linked internally within said gateway.

16. The fax relay apparatus of claim 1, wherein the fax relay apparatus is able to perform fax relay communication over the IP network between:

a fax equipment able to operate according to V.34 modulation; and a first remote device which selects non-V.34 modulation.

17. The fax relay apparatus of claim 1, wherein the fax relay apparatus is able to perform fax relay communication over the IP network between:

a fax equipment able to operate according to V.34 modulation; and a second remote device which performs fallback from V.34 modulation to non-V.34 modulation.

18. A method of fax relay, the method comprising:

converting non-V.34 fax relay streams which are based on non-V.34 modulation and which are incoming from an Internet Protocol (IP) network into V.34 fax relay streams;

forwarding the converted V.34 fax relay streams to a V.34 fax relay gateway;

converting output V.34 fax relay streams of said V.34 fax relay gateway into non-V.34 fax relay streams which are based on non-V.34 modulation;

forwarding the converted non-V.34 fax relay streams to a remote device over the IP network;

detecting V.8 packet exchange completed with an acknowledged V.34 fax application profile;

inspecting the fax relay streams exchanged over the IP network;

passing without conversion one or fax relay streams which correspond to a same modulation used by both the V.34 fax relay gateway and the remote device;

detecting fallback from V.34 modulation to non-V.34 modulation, and activating and controlling conversion of fax relay streams when a fallback from V.34 modulation to non-V.34 modulation is detected but said V.34 fax relay gateway cannot already accept the non-V.34 fax relay streams.

19. The method of claim 18, wherein converting the incoming non-V.34 fax relay streams comprises:

transcoding non-V.34 fax relay packets into V.34 fax relay packets;

blocking non-V.34 fax relay packets which cannot be transcoded into V.34 fax relay packets;

generating V.34 fax relay packets which are required by V.34 fax relay procedures and are disallowed by non-V.34 fax relay procedures; and aligning in time the V.34 fax relay streams before forwarding the V.34 fax relay streams to said V.34 fax relay gateway.

20. The method of claim 18, wherein converting output V.34 fax relay streams comprises:

transcoding V.34 fax relay packets into non-V.34 fax relay packets;

blocking V.34 fax relay packets which cannot be transcoded into non-V.34 fax relay packets;

generating non-V.34 fax relay streams which are required by non-V.34 fax relay procedures and are disallowed by V.34 fax relay procedures;

blocking the retransmitted V.34 fax relay streams of said V.34 fax relay gateway and to avoid collision of fax relay streams exchanged over the IP network; and aligning in time the non-V.34 fax relay streams before forwarding the non-V.34 fax relay streams to the IP network.

21. The method of claim 18, comprising:

performing V.8 message exchange adapted to avoid fax relay disconnection due to incompatibility of a first fax modulation selected by the V.34 fax relay gateway and a second fax modulation selected by the remote device.

22. The method of claim 18, comprising:

performing compromised management of data signaling rate of non-V.34 fax relay over the IP network, by compromising between fax relay session duration and fax relay reliability, and by taking into account a short duration of V.34 control channel signal exchange.

23. The method of claim 18, wherein converting non-V.34 fax relay streams comprises converting within said V.34 fax relay gateway; and wherein converting output V.34 fax relay streams comprises converting within said V.34 fax relay gateway.

24. The method of claim 18, wherein converting non-V.34 fax relay streams comprises converting externally to said V.34 fax relay gateway; and wherein converting output V.34 fax relay streams comprises converting externally to said V.34 fax relay gateway.

25. The method of claim 18, wherein converting non-V.34 fax relay streams is performed at V.34 fax call side; and wherein converting output V.34 fax relay streams is performed at said V.34 fax call side.

26. The method of claim 18, wherein converting non-V.34 fax relay streams is performed at V.34 fax answer side; and wherein converting output V.34 fax relay streams is performed at said V.34 fax answer side.

27. The method of claim 18, wherein the V.34 fax relay gateway is a V.34-only fax relay gateway.

28. The method of claim 18, comprising:

immediately upon fax relay session setup, initiating conversion of incoming non-V.34 and outgoing V.34 fax relay streams into incoming V.34 and outgoing non-V.34 fax relay streams, respectively.

29. The method of claim 18, comprising:

communicating with said remote device, wherein the remote device is selected from the group consisting of: a remote gateway, and an Internet-aware fax device.

* * * * *